May 5, 1936. C. A. BICKEL 2,039,876
AUTOMATIC LATHE
Filed Feb. 10, 1933 20 Sheets-Sheet 2

Inventor
CLIFFORD A. BICKEL,
By Toulmin & Toulmin
Attorneys

May 5, 1936. C. A. BICKEL 2,039,876
AUTOMATIC LATHE
Filed Feb. 10, 1933 20 Sheets-Sheet 5

Inventor
CLIFFORD A. BICKEL,
Attorneys

May 5, 1936.　　　C. A. BICKEL　　　2,039,876
AUTOMATIC LATHE
Filed Feb. 10, 1933　　　20 Sheets-Sheet 6
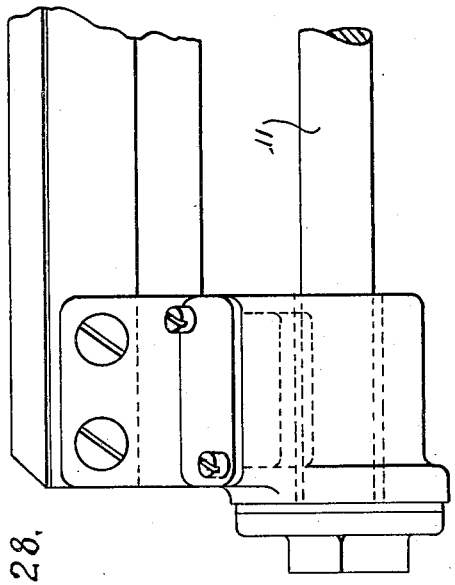
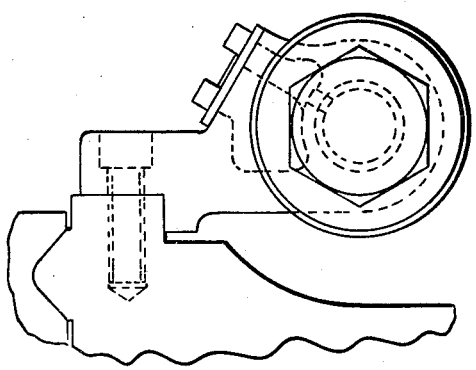
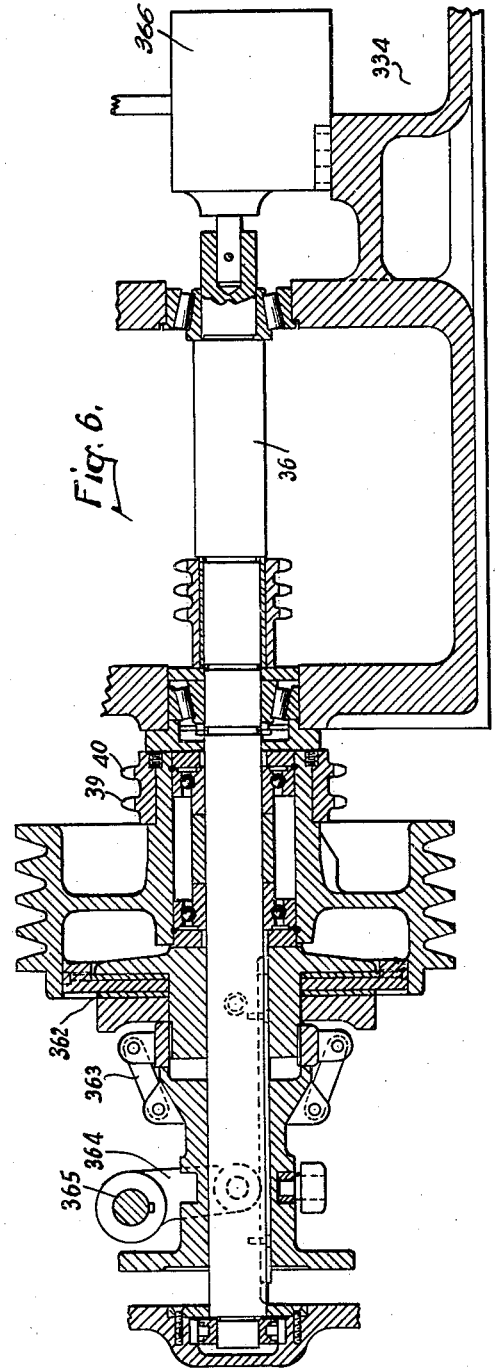
Inventor
CLIFFORD A. BICKEL,
Attorneys

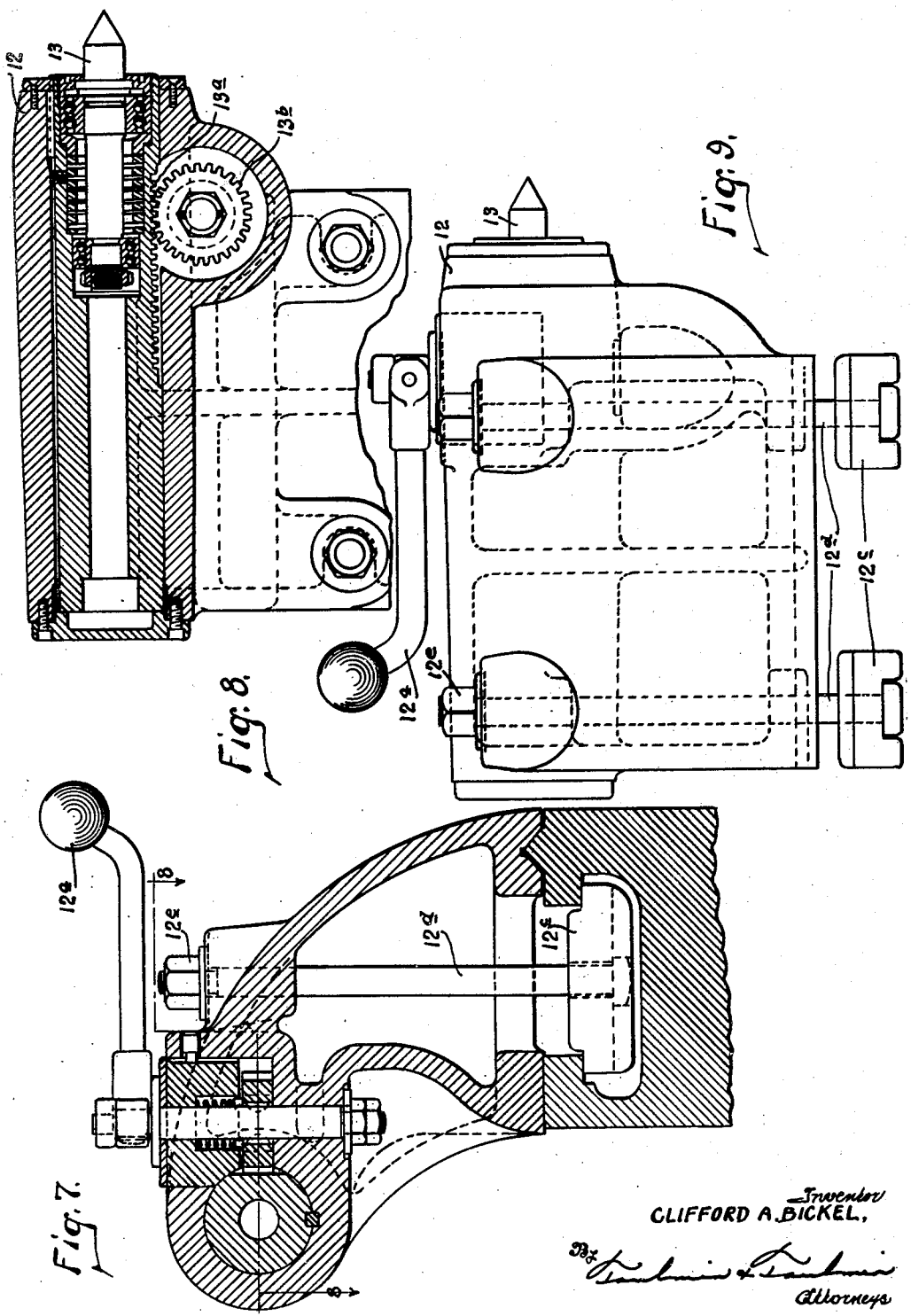

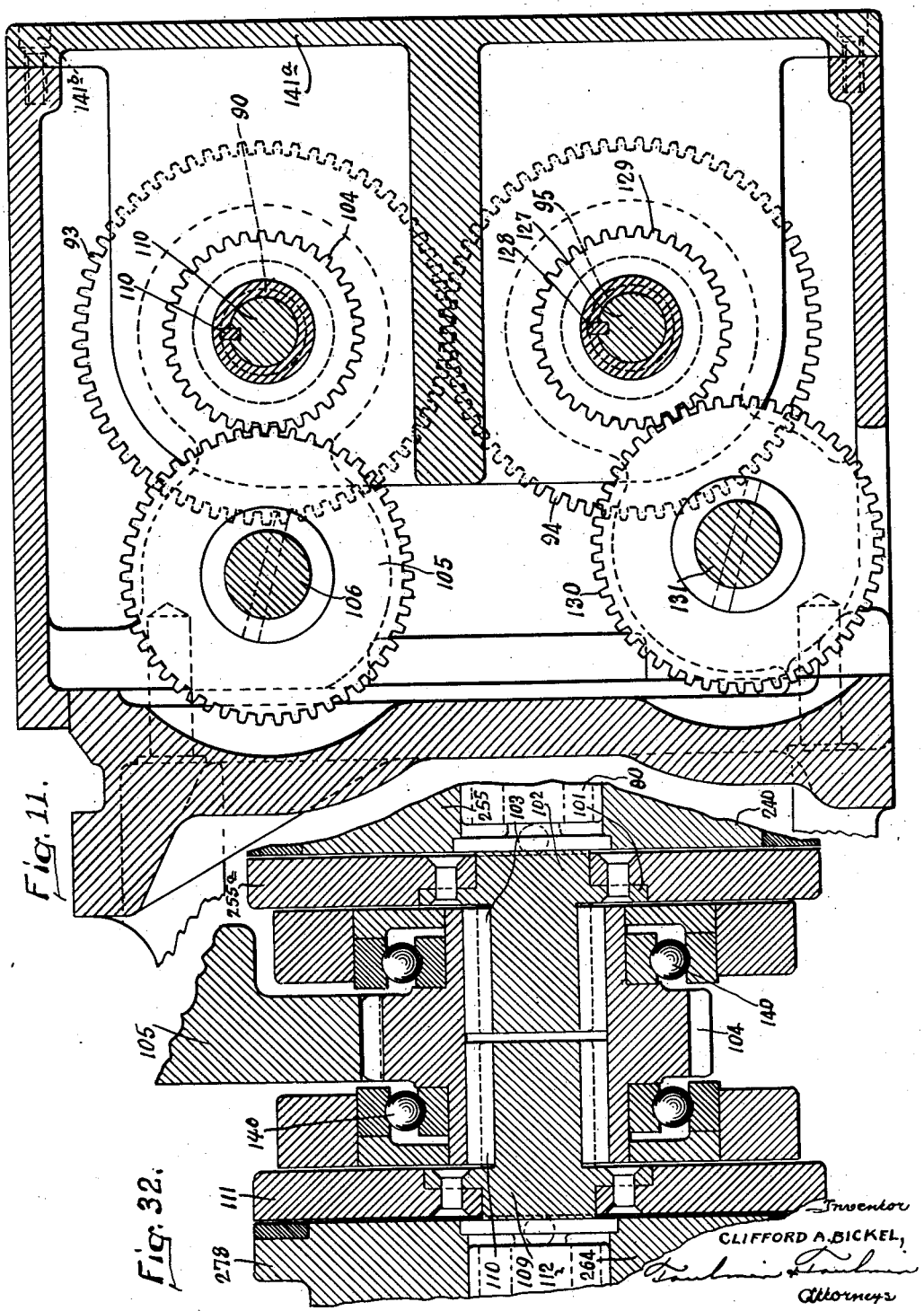

May 5, 1936.　　　C. A. BICKEL　　　2,039,876
AUTOMATIC LATHE
Filed Feb. 10, 1933　　　20 Sheets-Sheet 10

Inventor
CLIFFORD A. BICKEL,
Attorneys

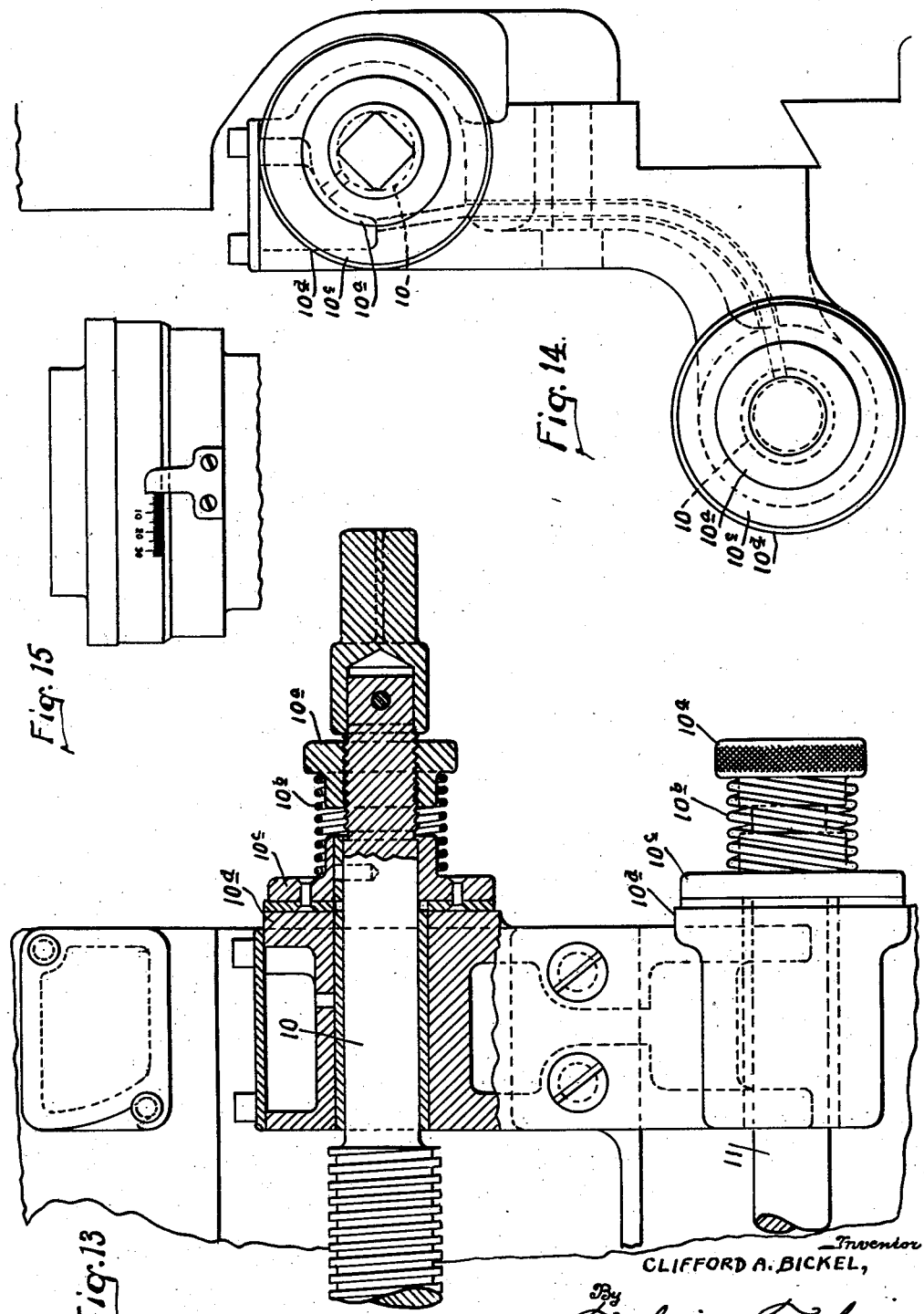

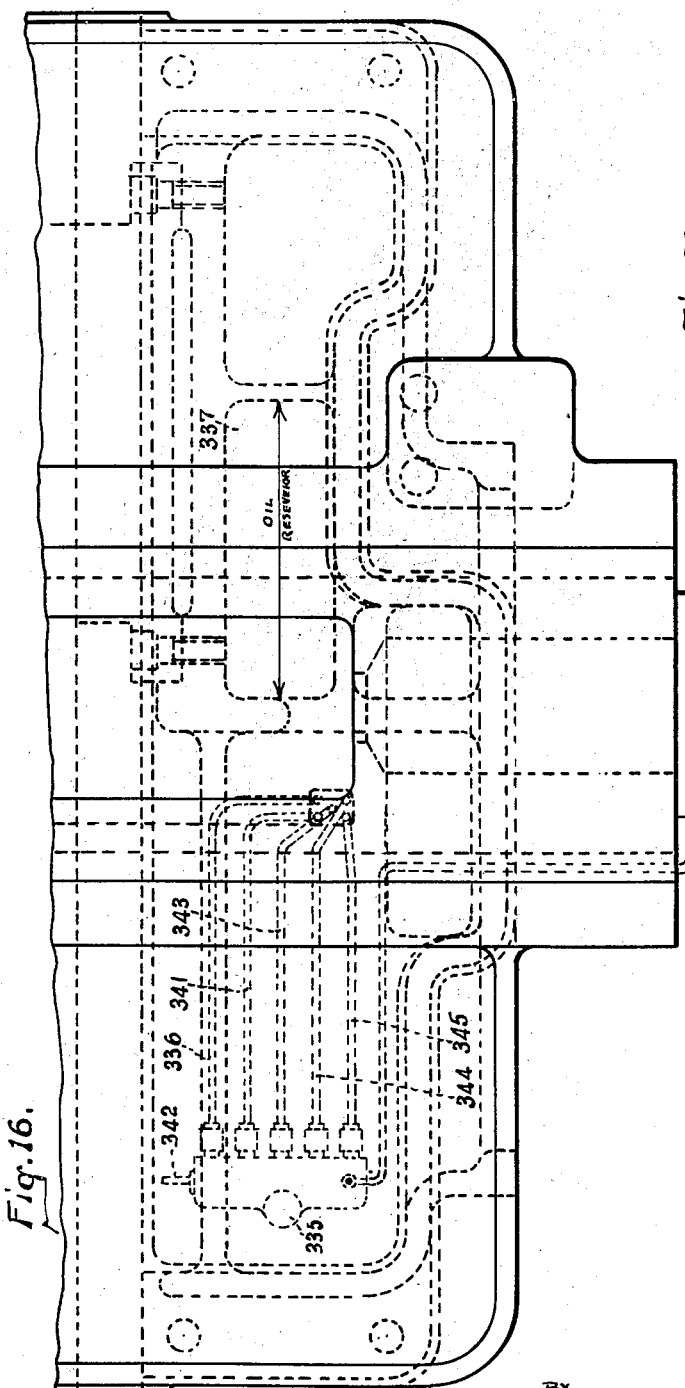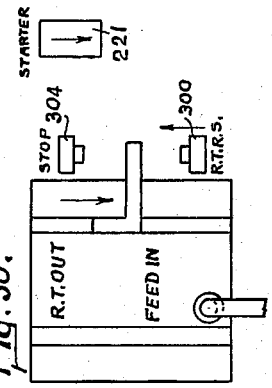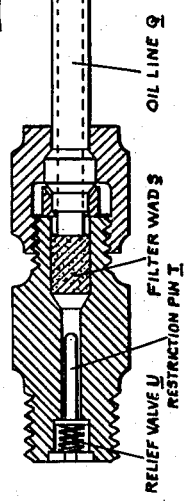

May 5, 1936.　　　　C. A. BICKEL　　　　2,039,876
AUTOMATIC LATHE
Filed Feb. 10, 1933　　　20 Sheets-Sheet 13
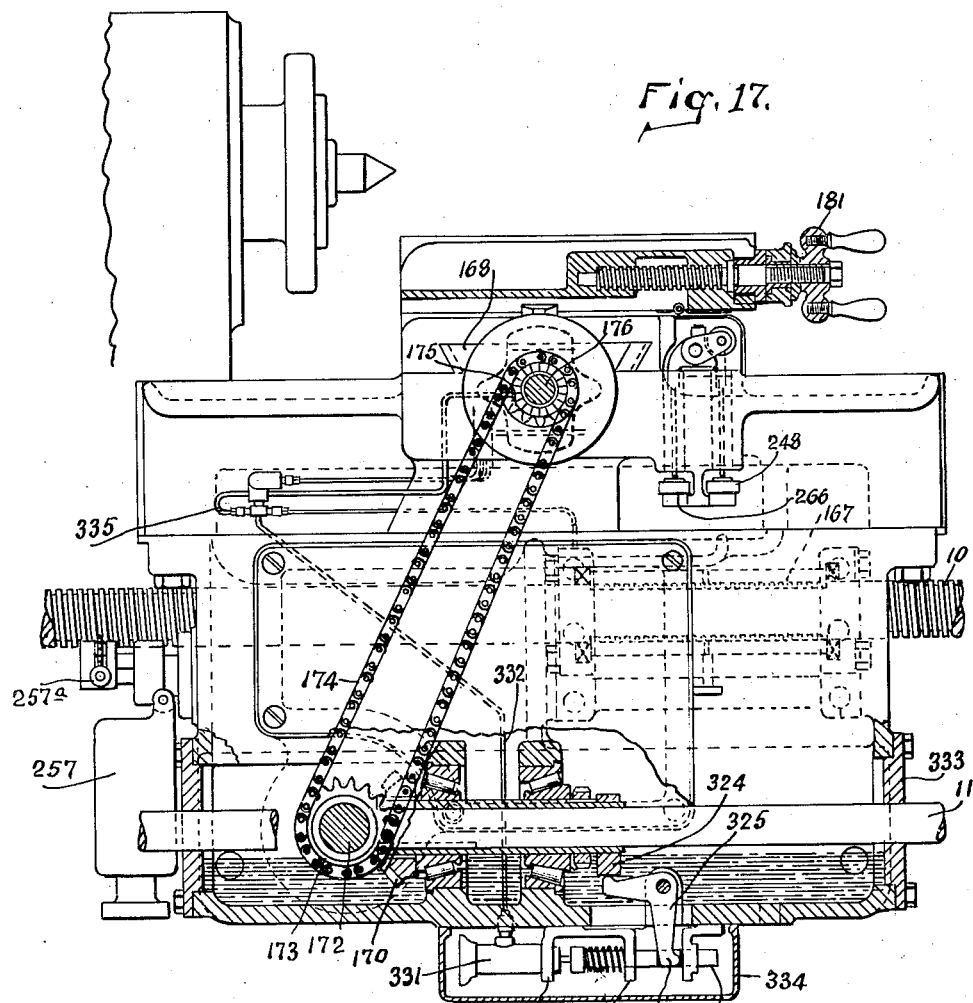
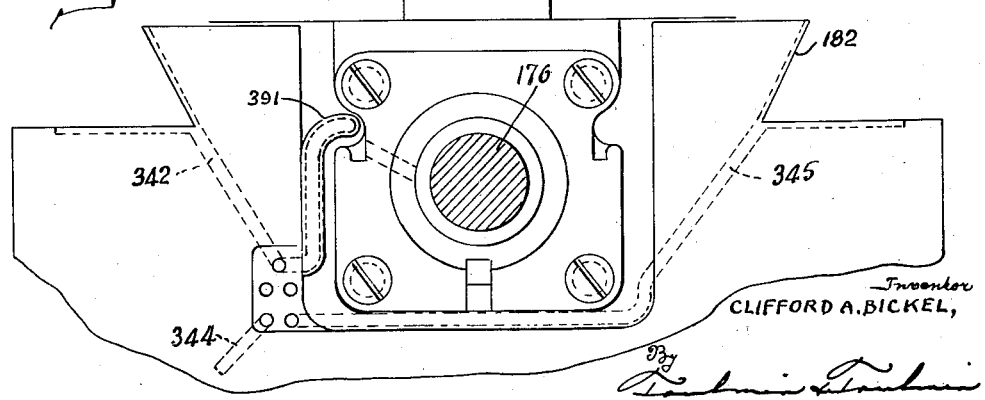

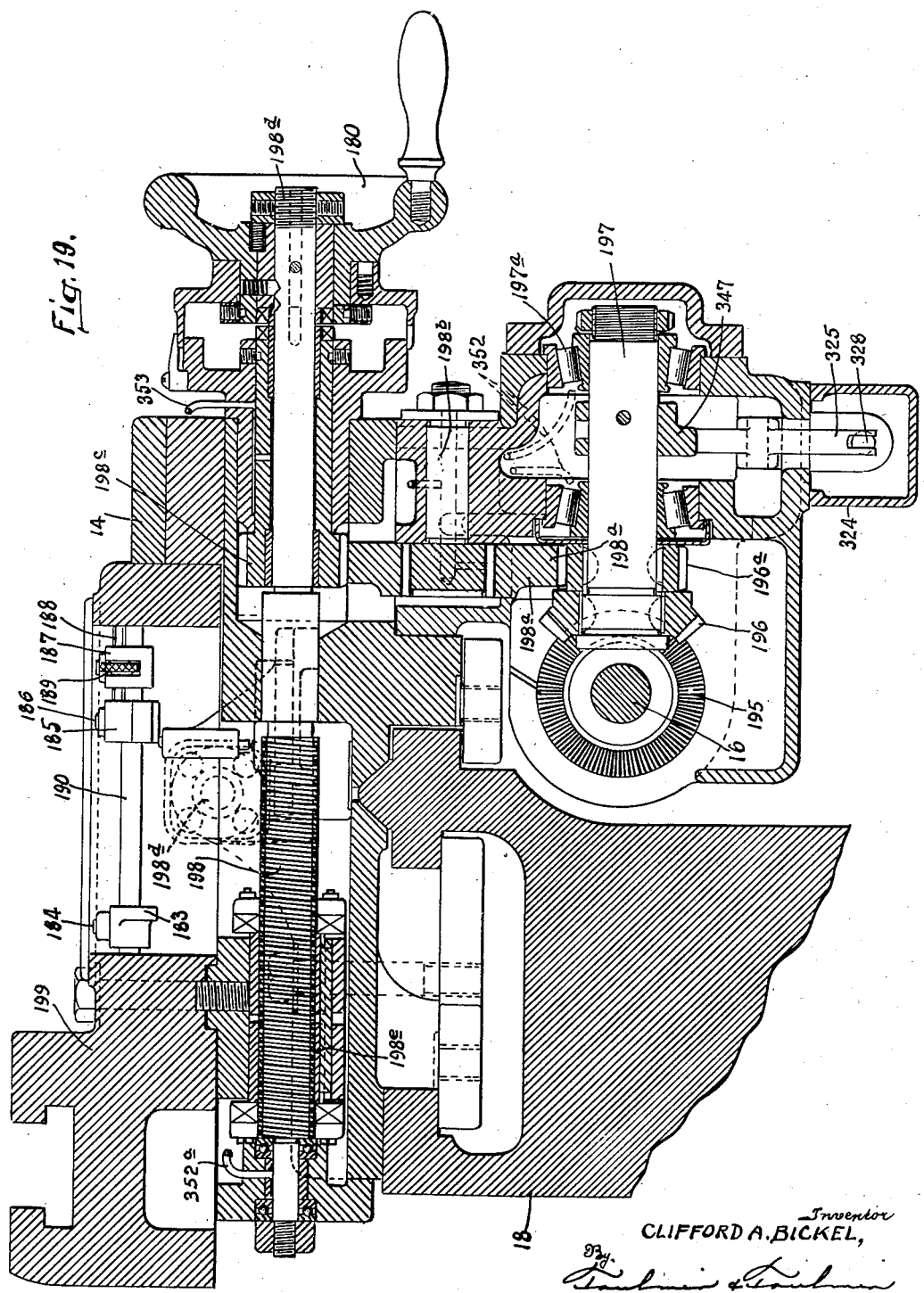

May 5, 1936.  C. A. BICKEL  2,039,876
AUTOMATIC LATHE
Filed Feb. 10, 1933  20 Sheets-Sheet 15
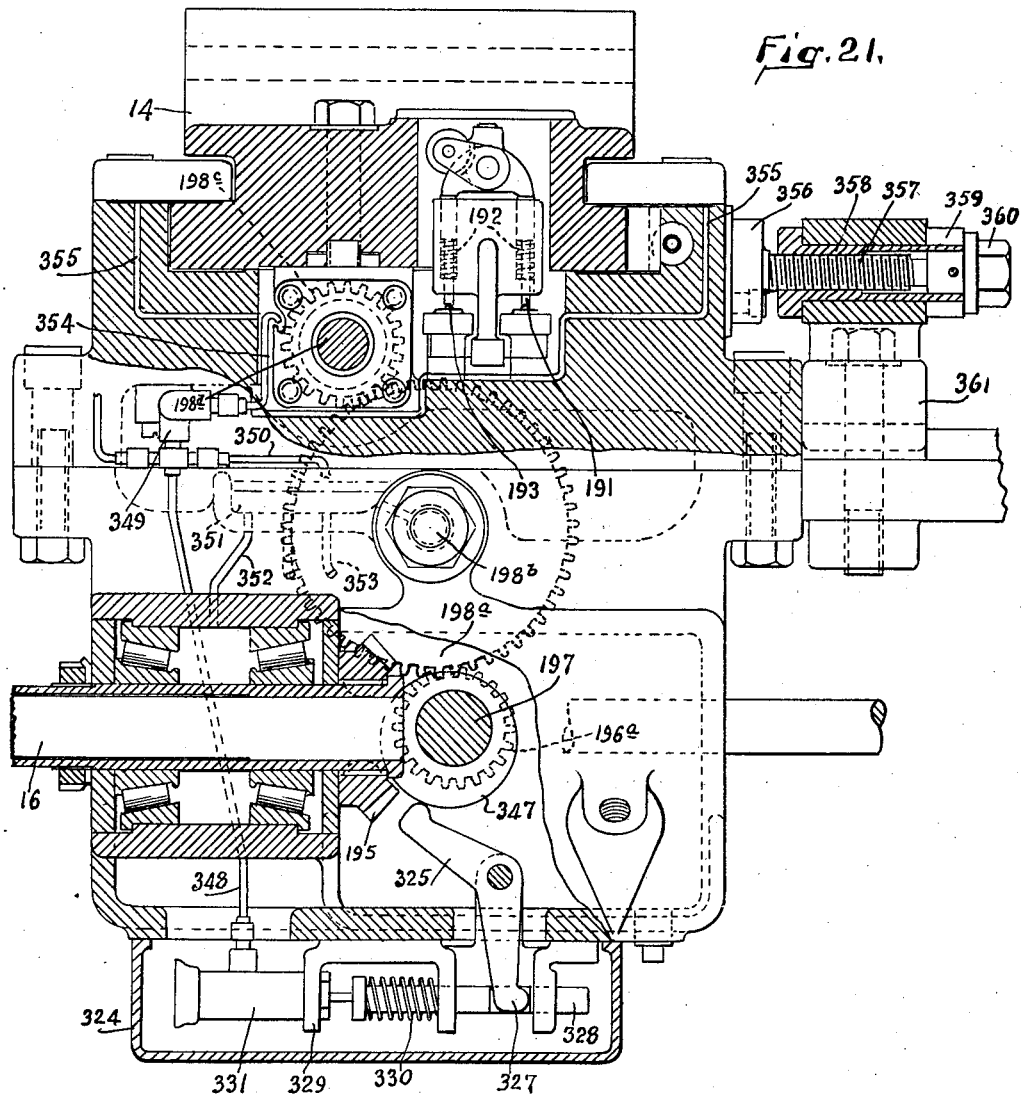
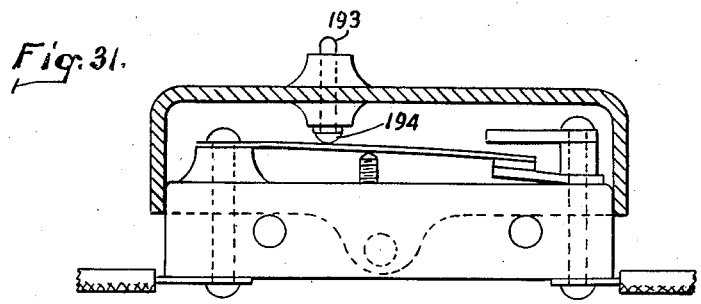
INVENTOR
CLIFFORD A. BICKEL,
BY
ATTORNEYS May 5, 1936.  C. A. BICKEL  2,039,876
AUTOMATIC LATHE
Filed Feb. 10, 1933   20 Sheets—Sheet 16
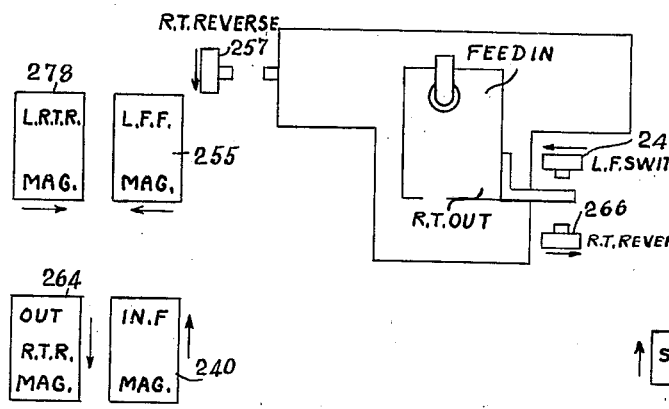
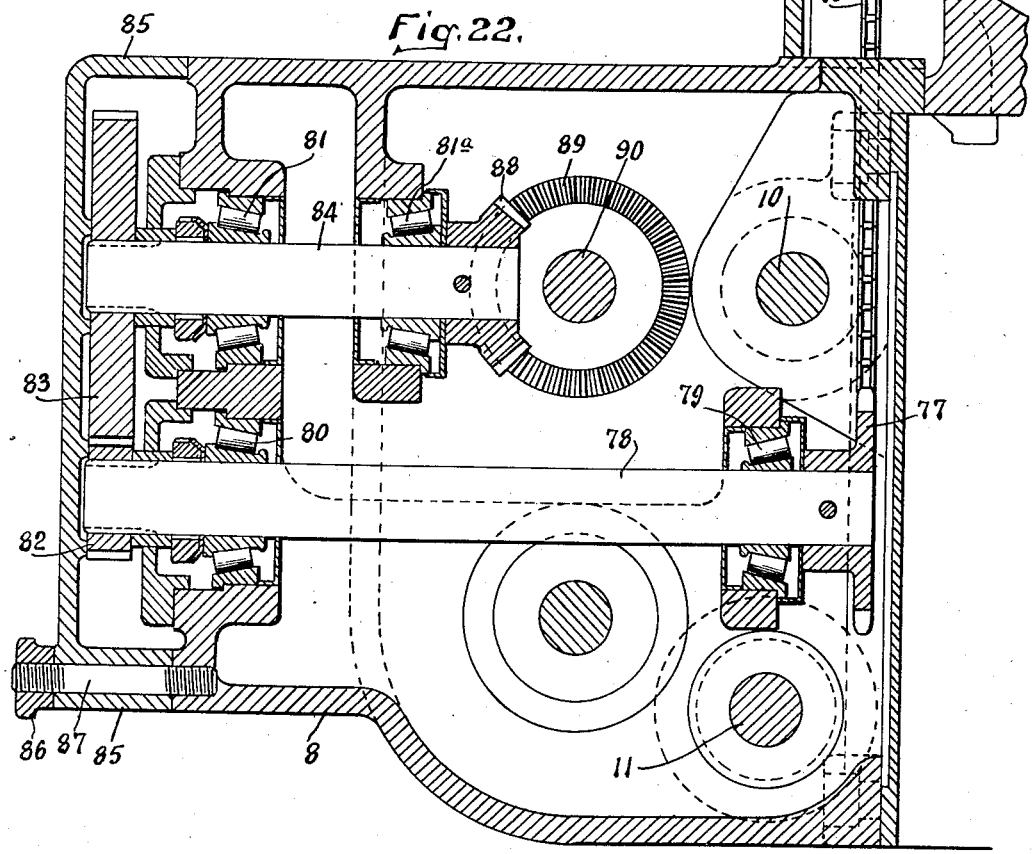
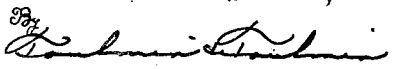

May 5, 1936.                C. A. BICKEL                2,039,876
                           AUTOMATIC LATHE
                        Filed Feb. 10, 1933          20 Sheets-Sheet 17
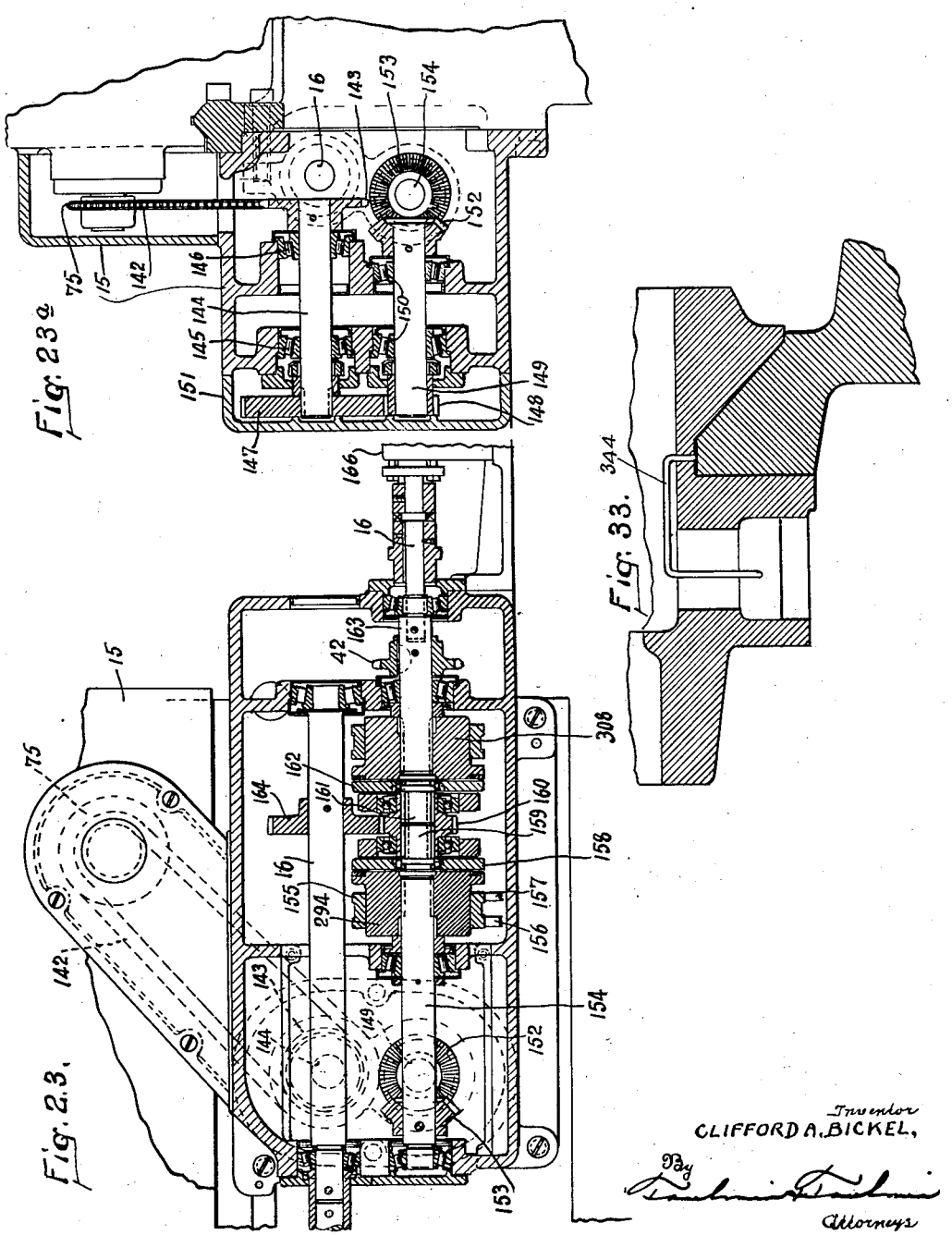
Inventor
CLIFFORD A. BICKEL,
By
Attorneys May 5, 1936. C. A. BICKEL 2,039,876
AUTOMATIC LATHE
Filed Feb. 10, 1933 20 Sheets-Sheet 18

Inventor
CLIFFORD A. BICKEL,
By
Attorneys

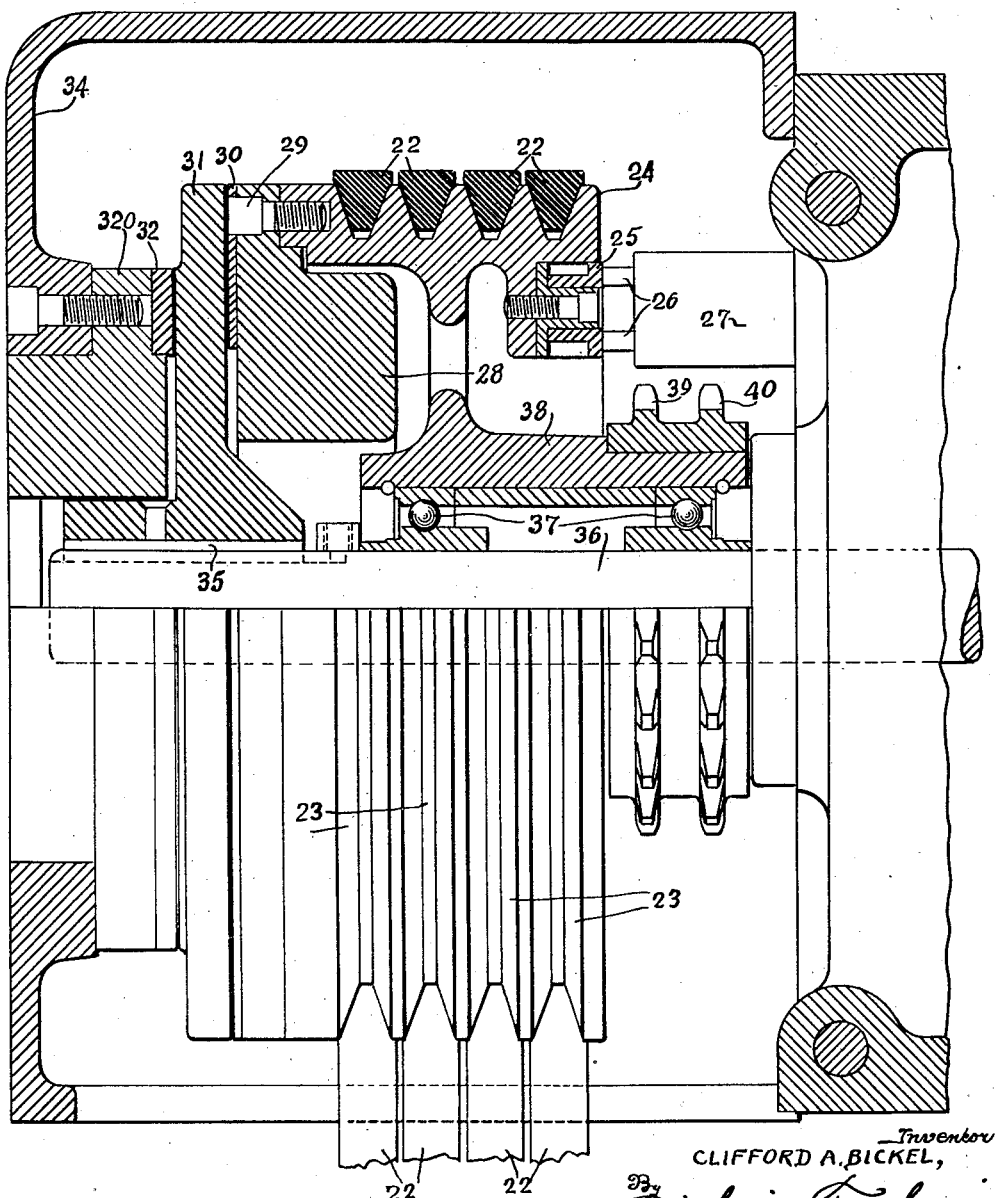

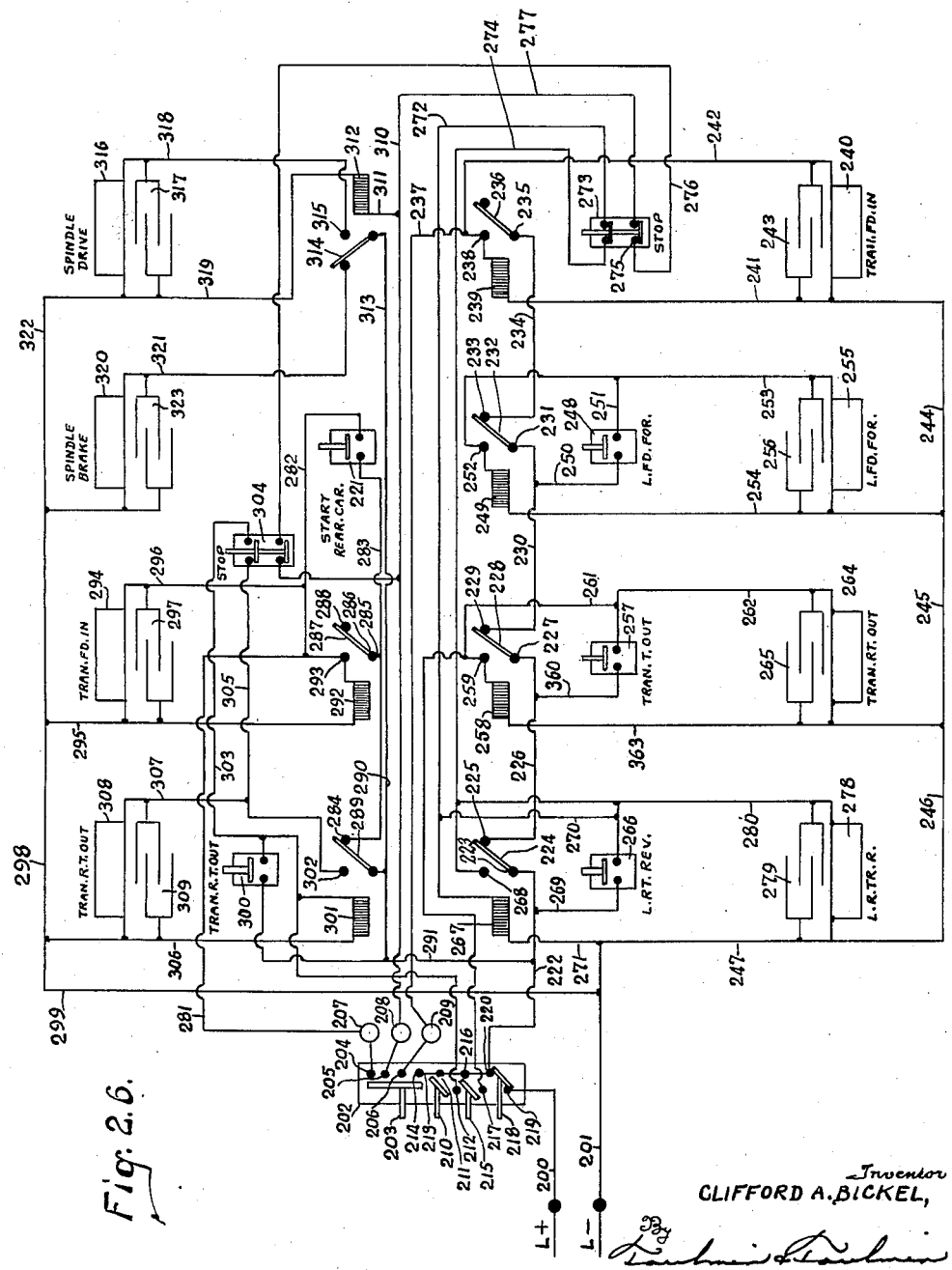

Patented May 5, 1936

2,039,876

UNITED STATES PATENT OFFICE 2,039,876

AUTOMATIC LATHE

Clifford A. Bickel, Sidney, Ohio, assignor to The Monarch Machine Tool Company, Sidney, Ohio, a corporation of Ohio Application February 10, 1933, Serial No. 656,173

44 Claims. (Cl. 82—2)

My invention relates to machine tools.

It is the object of my invention to provide a machine tool adapted to cut various configurations upon work pieces on an automatic lathe.

It is a further object to provide an electrically controlled automatic lathe, which will operate automatically according to the setting of the electrical controls and will be arranged to operate automatically from start to finish of the cutting operation on the work piece; it is an object to provide such an automatic lathe in which each operation has its separate electrical circuit with its separate magnetic clutch and separate switching system.

It is an object to provide means for closing the electric circuit to start the movement of either the front or the rear carriage, which electrical system will continue to automatically move the tool to its various cutting positions and, upon completion thereof, the circuit will be automatically opened.

Referring to the drawings:

Figure 6 is a section through the head stock drive pulley and pump shaft;

Figure 7 is a section on the line 8—8 of Figure 2 through the tail stock;

Figure 8 is a section on the line 8—8 of Figure 7 through the tail stock;

Figure 9 is a side elevation of the tail stock;

Figure 11 is a section on the line 11—11 of Figure 1 through the front gear box;

Figure 13 is a section on the line 13—13 of Figure 2 showing the front lead screw box and brake;

Figure 14 is an end elevation thereof from the right hand end of the machine;

Figure 15 is a plan view in detail of one of the micrometer adjusting scales for the carriage screw;

Figure 16 is a top plan view of the front portion of the front carriage showing in dotted lines the arrangement of the oiling system;

Figure 17 is a section on the line 17—17 of Figure 2 showing partially in section the front carriage and its lubricating mechanism;

Figure 18 is a section on the line 18—18 of Figure 2;

Figure 19 is a section on the line 19—19 of Figure 2 through the rear carriage;

Figure 21 is a section on the line 21—21 of Figure 2;

Figure 22 is a section on the line 22—22 of Figure 2;

Figure 23 is a section through the rear gear box on the line 23—23 of Figure 2;

Figure 23a is a section on the line 23a—23a of Figure 2;

Figure 25 is a section on the line 25—25 of Figure 2 showing the main drive shaft;

Figure 26 is a wiring diagram;

Figure 27 is an end elevation of the rear feed rod box and brake;

Figure 28 is a front elevation thereof;

Figure 29 is a diagrammatic view of the electrical apparatus and the relationship thereof to the mechanical apparatus of the front carriage;

Figure 30 is a similar view of the rear carriage;

Figure 31 is a section through the switch;

Figure 32 is an enlarged detail of the armature shaft as shown in Fig. 12;

Figure 33 is an enlarged view of Fig. 10 showing the details of oiling the carriage ways;

Figure 34 is a section through a metering oil connection.

Figure 1:
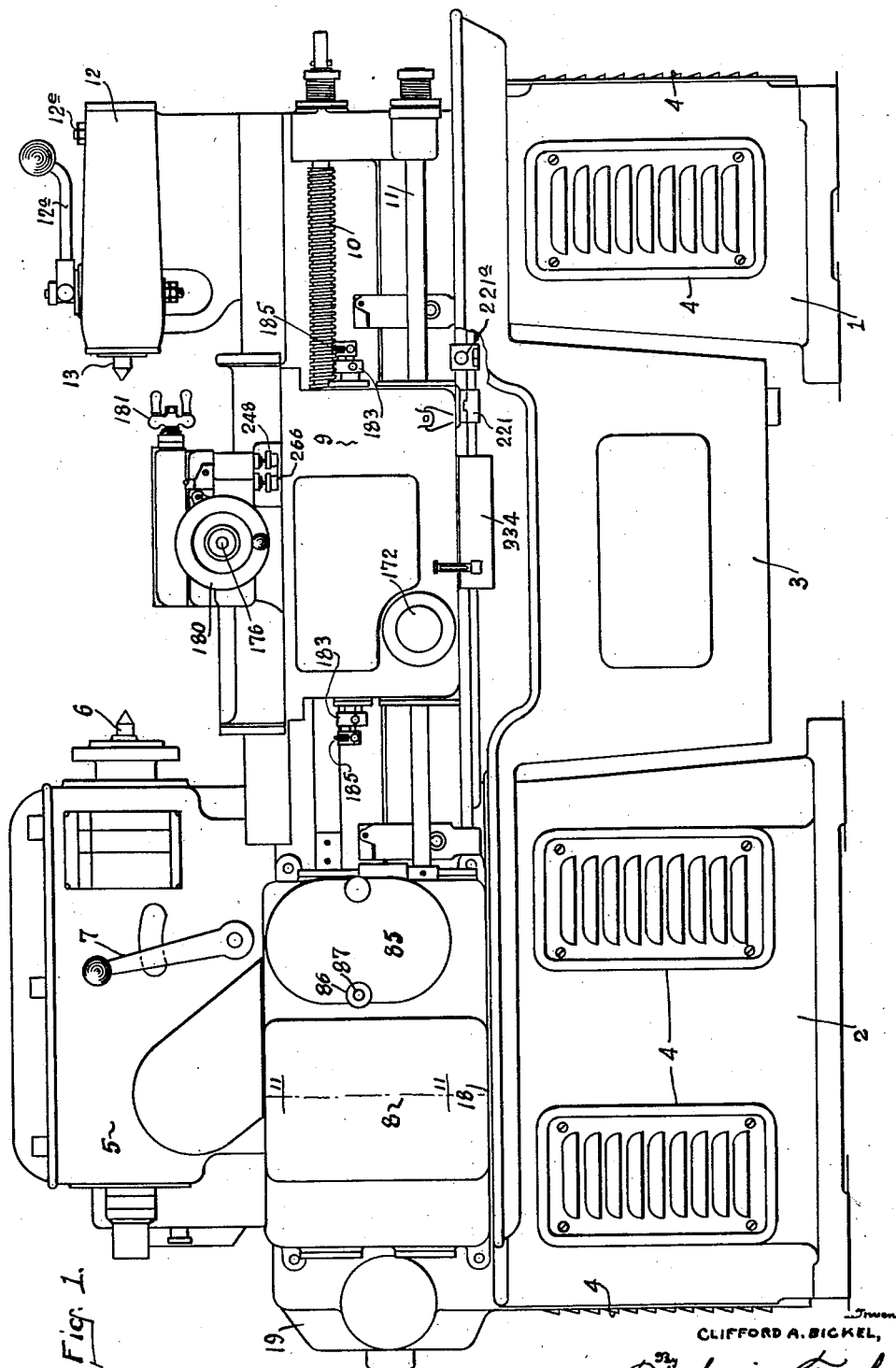
Figure 1 is a front elevation of the tool.
Figure 2:
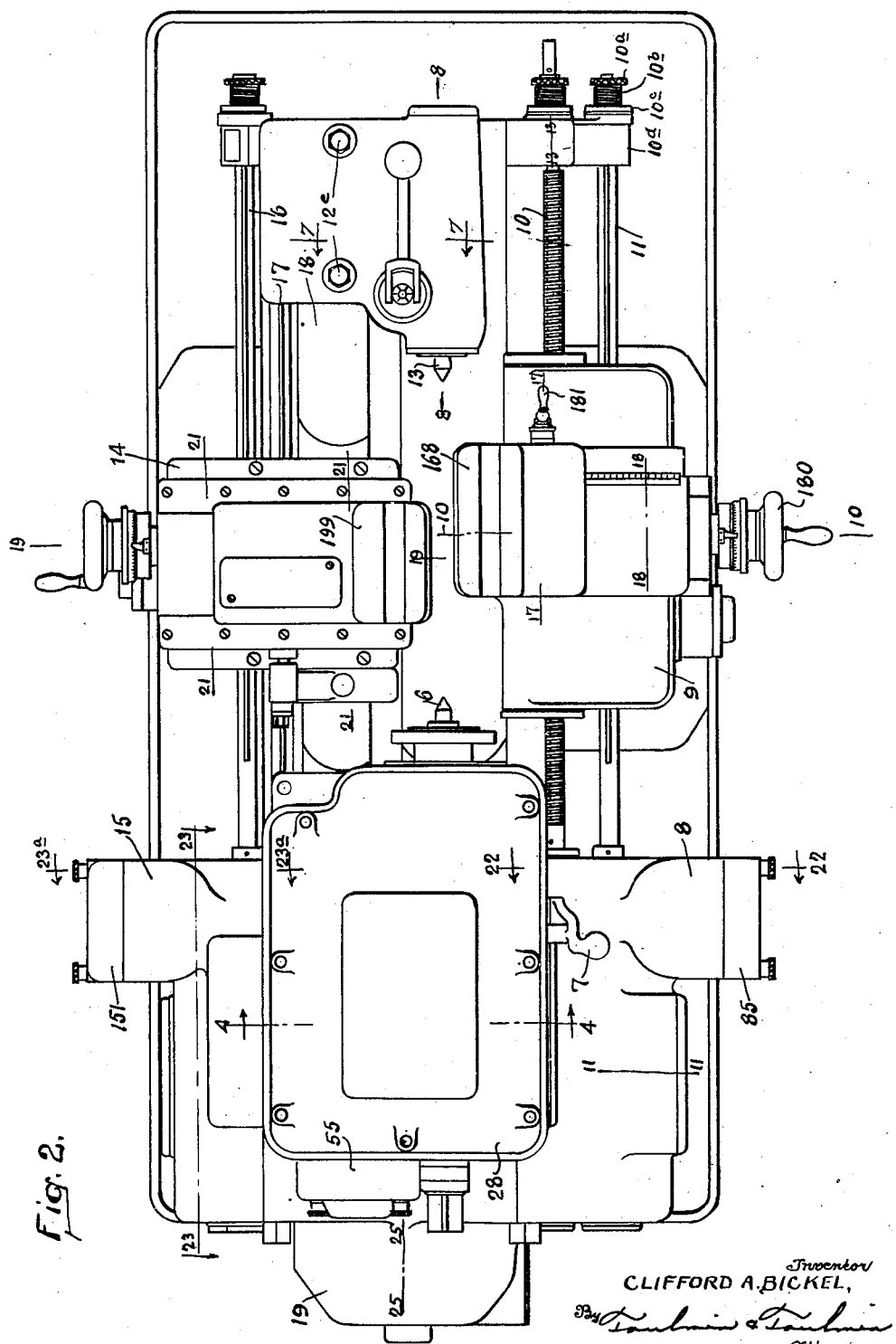
Figure 2 is a top plan view.
Figure 3:
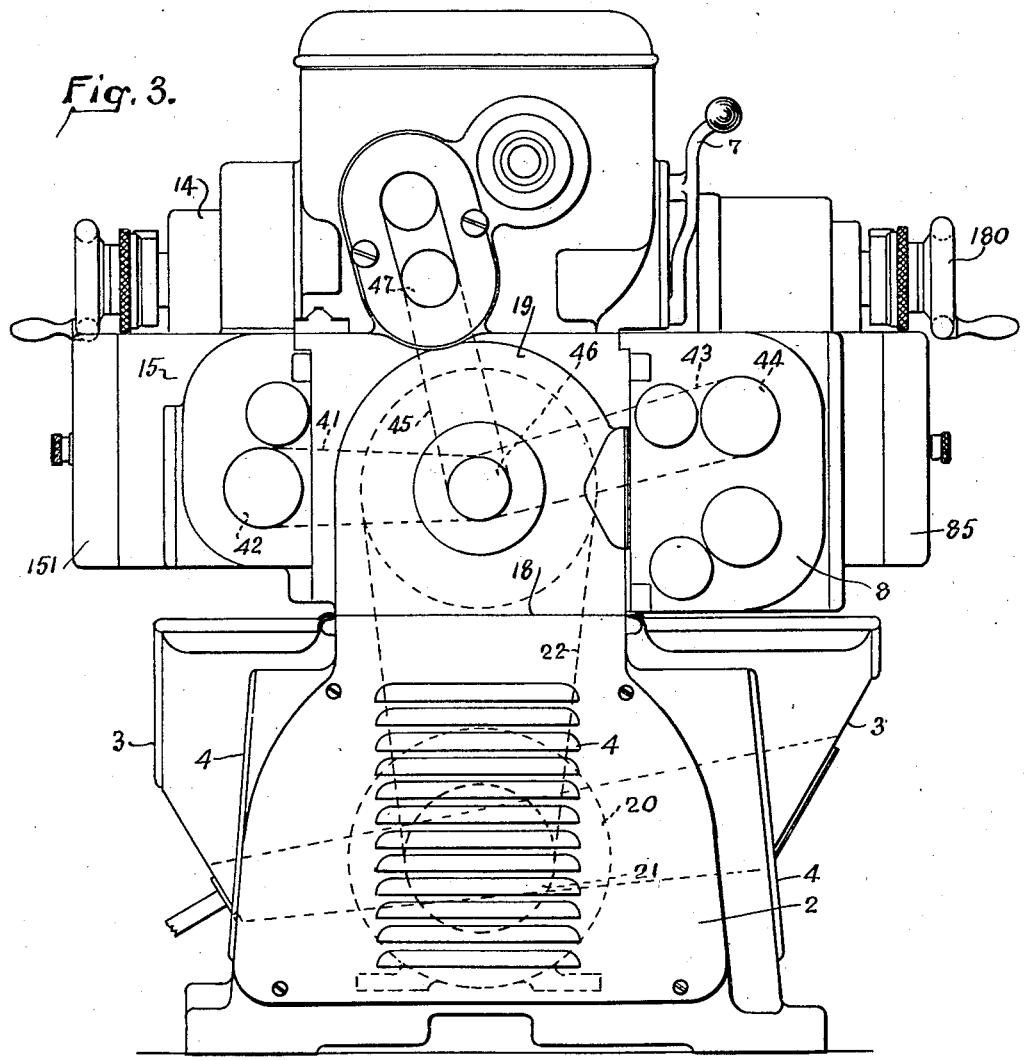
Figure 3 is an end elevation from the left.

Referring to the drawings in detail, 1 and 2 designate the base legs of a machine tool having an intermediate pan 3. The base legs are provided with louver panels 4 for the ventilation of the interior thereof. 5 indicates the head stock having the head stock spindle 6. 7 is the head stock gear shift lever. 8 indicates the front gear box. 9 indicates the front carriage. 10 indicates the front lead screw and 11 the front feed rod. 12 designates the tail stock having the tail stock spindle 13.

14 designates the rear carriage and 15 the rear gear box mounted on a guide 17. 16 is the rear feed rod. 18 designates the bed plate of the lathe upon which the front and rear carriages 9 and 14 reciprocate.

19 designates the clutch guard at the left hand end of the machine.

Main drive

In the base 2 there is located the main motor 20 having the multiple V-groove pulley 21. Mounted on the pulley 21 are a plurality of V-belts 22 which are mounted in a plurality of V-grooves 23 in the multiple V-groove pulley 24. This pulley is provided on one face with collector rings 25 engaged by the brushes 26 mounted in the brush holder 27.

On its opposite face is the clutch magnet 28 attached thereto by the screws 29 which also retain in position the clutch friction disk 30 which engages with the intermediate disk 31, the back of which is engaged by the braking disk 32 mounted on the brake magnet 32a which is bolted to the housing 34.

The disk 31 is keyed by the key 35 to the shaft 36 which acts as a supporting shaft for the bearing 37 for the pulley 24 in its sleeve 38. This sleeve has mounted thereon a pair of spaced sprockets 39 and 40 which are likewise supported through the sleeve 38 on the bearing 37 mounted on the shaft 36. The sprocket 39 drives through the chain 41 the sprocket 42 which operates the rear gear box.

The chain 43 driven from the sprocket 40 drives the sprocket 44 on the front gear box.

Head stock

The pulley shaft 36 extends into the head stock casing 28 through the aperture 33. It is supported upon the bearing 33a. The sprocket 46, which is keyed to the pulley shaft 36, drives the chain 47 mounted on the spindle sprocket 48 upon the first intermediate shaft 49 which is carried in bearings 50 and 51 in the head stock housing 28.

On the left hand end of the first shaft 49 is mounted the pick-off pinion 52 engaging with a pick-off gear 53 of the second intermediate shaft 54. These pick-off gears are accessible upon removing the pick-off gear head stock casing 55. The second intermediate shaft 54 is mounted in spaced bearings 56 and 57. It carries on its right hand end fixed keys 58 upon which slides a pinion 59 which is formed integrally with the gear 60. These two gears are moved as a unit by the pin and shoe 61 actuated by the gear shifting yoke 62 mounted on the shaft 63 which is operated by the gear shifting lever 7. The extreme right hand end of the shaft 54 is mounted within the bearing 65.

The pinion 59 is adapted to engage with the gear 66 and the gear 60 is adapted to engage with the pinion 67. The gear 66 and pinion 67 are mounted upon the spindle shaft 68. This shaft also carries the worm 69.

Mounted transversely of the gear box of the head stock is a cross drive feed shaft for front and rear carriage drive. This shaft is designated 70. It has mounted on it a worm gear 71 meshing with the worm 69.

It is supported at either end upon bearings 72 and 73. On the front, it carries the front carriage drive sprocket 74 and on the rear the rear carriage sprocket 75.

Front gear box

Figure 12:
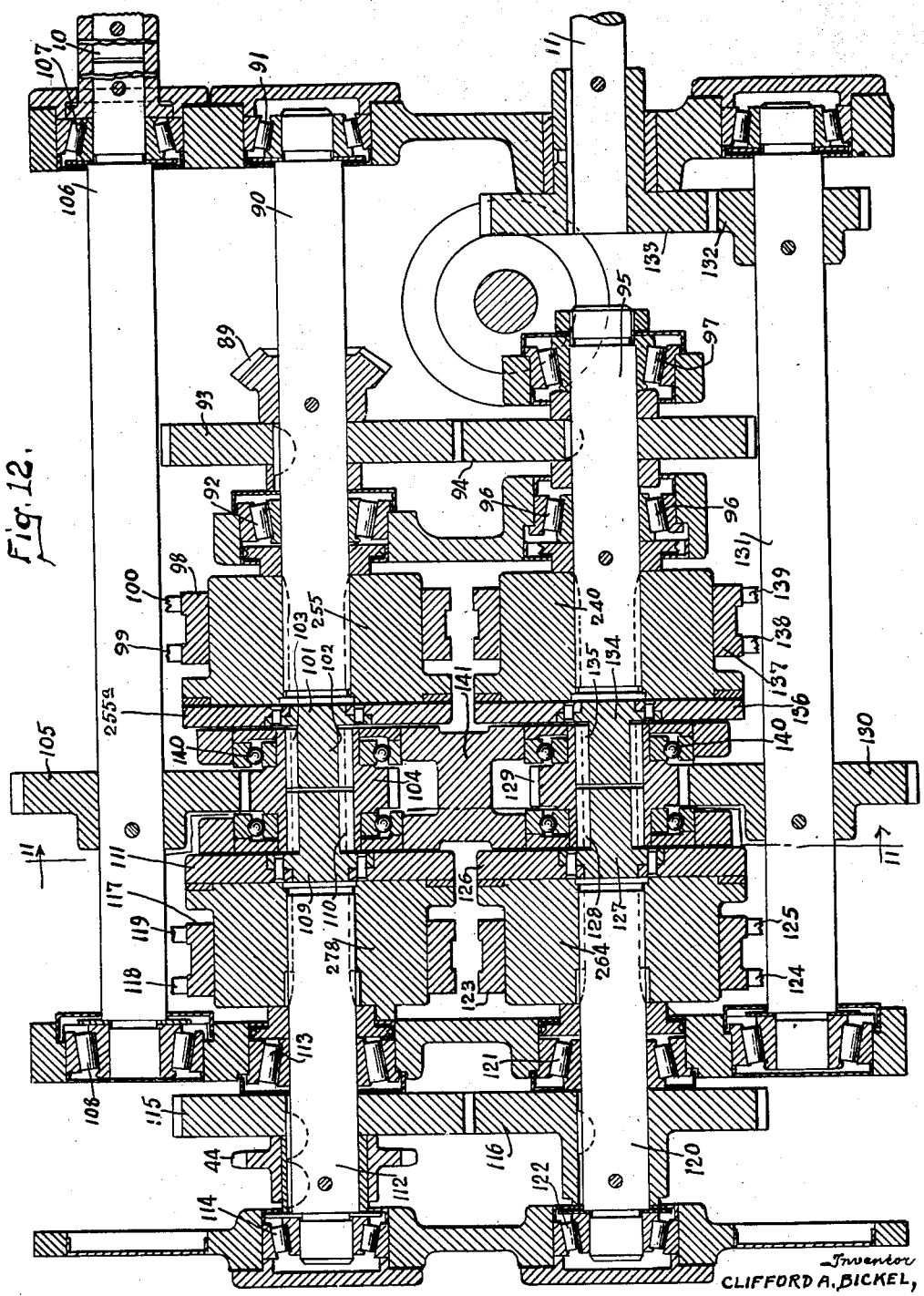
Figure 12 is a section through the front gear box with the shafts laid out with the gear and clutches to show their relative arrangement.

Turning to Figures 11, 12 and 22 it will be seen that the sprocket 74 drives the chain 76 which, in turn, drives the sprocket 77 on the lower change gear shaft 78 of the front gear box. This shaft is supported in bearings 79 and 80 which are supported in the front gear box casing 8. The lower change gear shaft 78 carries a pick-off pinion 82 on its left hand or front end which meshes with a pick-off gear 83 on the upper change gear shaft 84. The removable change gear housing 85 on the front of the gear box is removed by loosening the nuts 86 on the bolts 87. The upper change gear shaft is mounted in the spaced bearings 81 and 81a. It carries a beveled pinion 88 which in turn meshes with a bevel gear 89 on the longitudinal magnet shaft 90.

Turning to Figures 11 and 12, the shaft 90 carrying the gear 89 is mounted adjacent its ends in the bearings 91 and 92. It carries a gear 93 which meshes with the gear 94 on the cross feed magnet shaft 95 which is mounted in the bearings 96 and 97. The shaft 90 carries the feed forward longitudinal magnet 255. Mounted on this magnet is a collar used as a collector ring designated 98 on which are mounted the brushes 99 and 100 connected to the lines 253 and 254.

Associated with this magnet is an armature plate 255a. This plate is mounted upon a head 101 on the armature shaft 102 to which is keyed by the key 103 the pinion 104. Such a pinion is meshed with the gear 105 that is mounted on the lead screw jack shaft 106.

This lead screw jack shaft is connected to the lead screw 10 at the right hand end of the jack shaft, as shown in Figure 12. The jack shaft is supported in spaced bearings 107 and 108 in the gear box casing.

The pinion 104 also carries the armature shaft 109 being keyed thereto by the key 110. This armature shaft carries the armature plate 111 which is engaged by the rapid traverse longitudinal shaft magnet 278 which is mounted on the rapid traverse longitudinal shaft 112. This shaft carries on its outer end the sprocket 44 which is keyed to the shaft 112. The shaft is mounted on the bearings 113 and 114. It also carries the gear 115 which in turn meshes with the gear 116.

The usual collector ring 117 is mounted on the magnet 278 and is engaged by the brushes 118 and 119 connected to the lines 280 and 247.

The gear 116 is mounted on the rapid traverse tool slide shaft designated 120 which carries the magnet 264.

The shaft is supported by the spaced bearings 121 and 122. The magnet carries the collector ring 123 engaged by the brushes 124 and 125 connected to the lines 363 and 262.

The magnet 264 is adapted to be engaged by the armature plate 126 which is carried on the armature shaft 127 to which is keyed by the key 128 the pinion 129 which meshes with the gear 130 on the feed rod jack shaft 131. This jack shaft carries the pinion 132 meshing with the feed rod gear 133 mounted on the feed rod 11. The pinion 129 also carries the armature shaft 134 which is keyed to it by the key 135. This armature shaft has the armature plate 136 adapted to engage the magnet 240 which is the transverse feed-in magnet mounted on the cross feed magnet shaft 95. This magnet is likewise provided with a collector ring 137 engaged by brushes 138 and 139 connected to the lines 241 and 242. The pinions 104 and 129 and their armature shafts are mounted in suitable ball bearings designated 140 in the partition 141 of the gear box casing.

Referring to Figure 11, it will be noted that the front plate 141a is detachable by removing the bolts 141b which permits of the lifting out of the entire assembly magnets, their shafts 109, 127, etc. and associated gearing which facilitates repair, assembly in manufacturing and replacement without shutting down of the tool.

Rear gear box

The sprocket 75 (see Figure 23a) drives the chain 142 which in turn drives the sprocket 143 mounted on the shaft 144. This shaft is mounted in spaced bearings 145 and 146 in the rear gear case housing 15.

The end of the shaft carries a pick-off gear 147 which meshes with the pick-off pinion 148 carried on the shaft 149. The shaft 149 is carried in the spaced bearings 150. Pick-off gears 147 and 148 are carried within the detachable pick-off housing 151.

The shaft 149 carries a beveled pinion 152 which meshes with the pinion 153 on the cross feed-in magnet shaft 154 shown in Figure 23. The cross feed-in shaft carries the cross feed-in magnet 294. On this magnet is a slip ring 155 having the brushes 156—157 connected to the wires 295 and 296. The magnet is provided with an armature plate 158 mounted on the armature shaft 159 to which is keyed the pinion 160.

This pinion also carries the armature shaft 161 and armature plate 162. Cross feed rapid traverse out magnet 308 is associated with the armature plate 162 and is mounted upon the cross feed traverse out shaft 163. The pinion 160 meshes with the gear 164 on the feed rod 16.

On the cross feed traverse out shaft is the sprocket 42 which is connected to the chain 41. By this arrangement the feed rod can be driven in opposite directions to move the tool slide on the rear carriage in and out. The shaft 163 is connected by the coupling 165 to the oil pump 166 which will be described later in connection with the oiling system.

Front carriage

Figure 10:
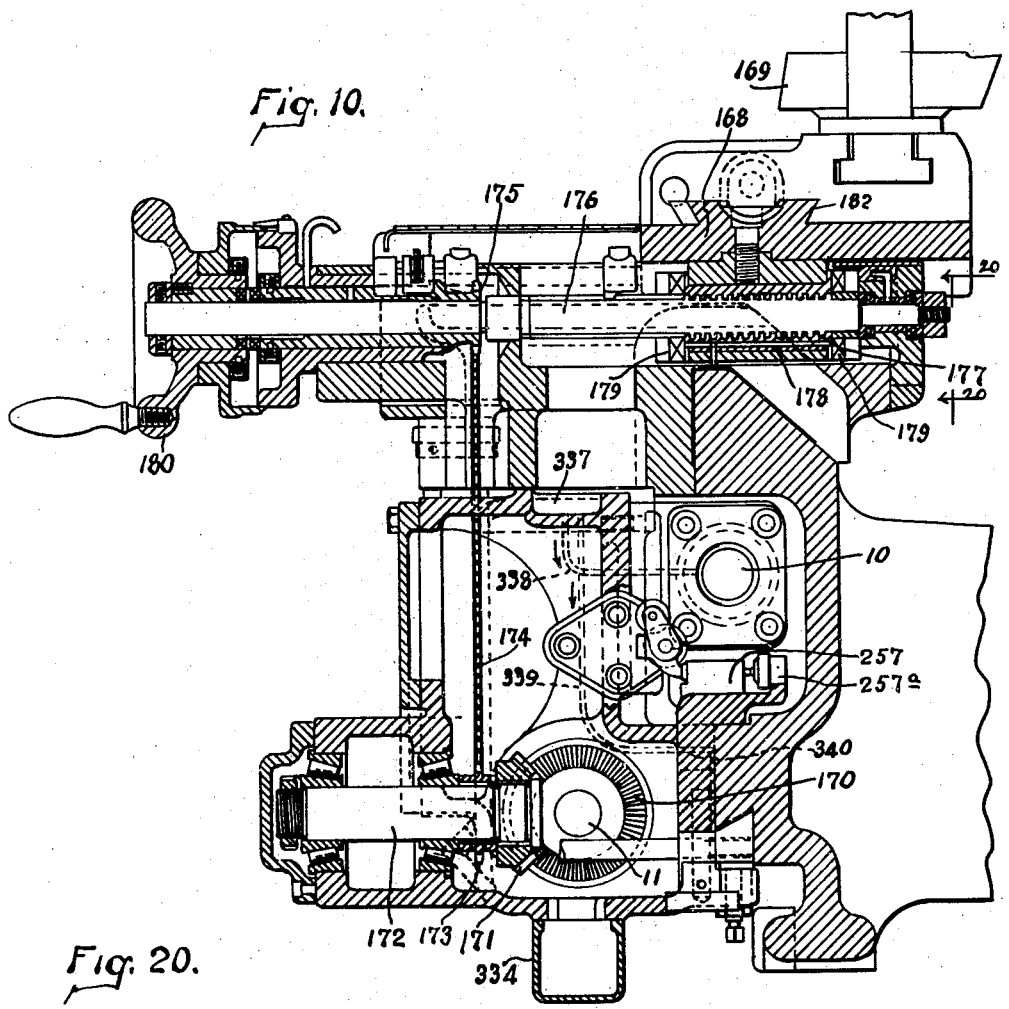
Figure 10 is a section on the line 10—10 of Figure 2 through the front carriage.
Figure 20:
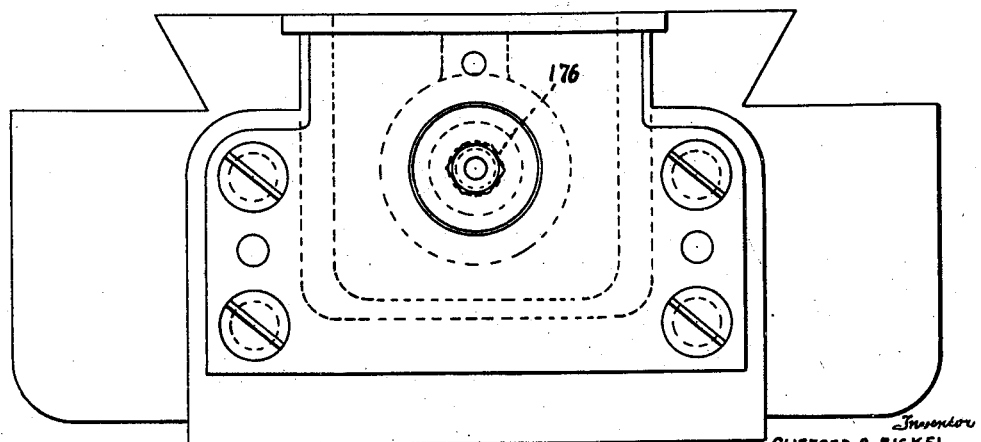
Figure 20 is a section on the line 20—20 of Figure 10.

Referring to the front carriage drawings, particularly in Figures 10, 18 and 19, the carriage moves longitudinally by the lead screw 10 operating in the nut 167. The movement of the lead screw is determined by the electrical mechanism hereinafter more particularly described and the gear box arrangement of the front gear box already described.

The feed rod 11 determines the in and out movement of the tool slide 168 carrying the tool 169.

This is accomplished by the beveled gear 170 on the feed rod actuating the beveled pinion 171 on a transversely arranged jack shaft 172 which carries a sprocket 173 driving a chain 174, which, in turn, drives the sprocket 175 on the tool slide actuating shaft 176. This shaft is mounted in the carriage in the usual manner and is provided with a screw 177 operating within the nut 178 carried by the tool slide 168, thus actuating the slide inwardly and outwardly. In order to maintain a tight self-adjusted feed, I provide compensating self-adjusting rings at either end of the nut at 179.

The remaining portions of the carriage and tool slide may be of any conventional design and, therefore, need no special description.

The hand wheel 180 effects the in and out movement of the tool slide for hand adjustment and the hand wheel 181 effects the transverse movement of the tool on its slide for transverse adjustment. The tool slide is mounted on the carriage by the dove tail 182 which is lubricated as hereinafter described.

The carriage is adapted on its extreme left hand movement to actuate the switch 257, the stop for which is adjusted at 257a.

Figure 24:
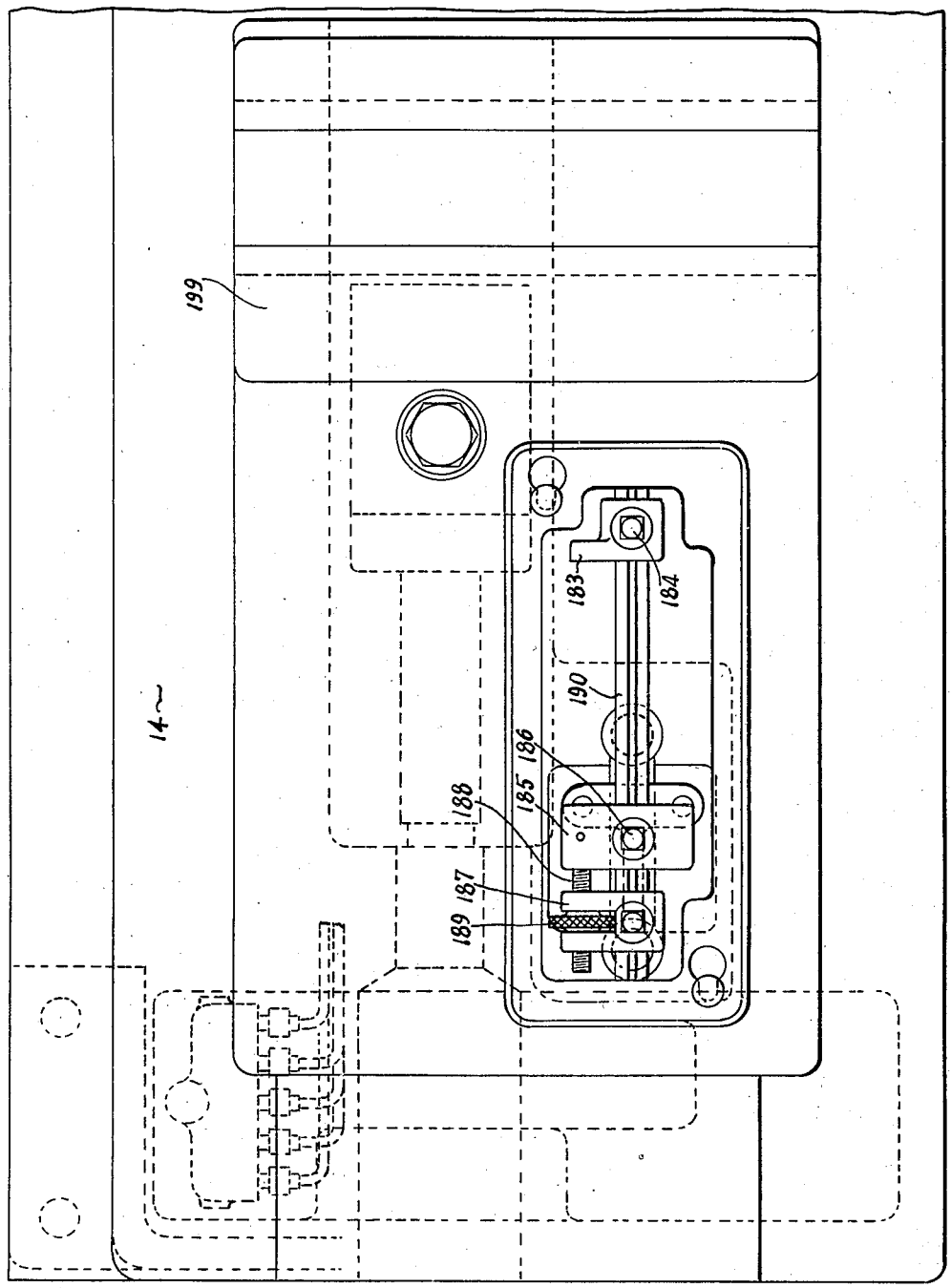
Figure 24 is a top plan view with a portion of the cover removed of the rear carriage indicating in dotted lines a portion of the oiling system.

As indicated in Figure 24, as well as in Figures 17 and 19, the point at which the switches 248 and 266 on the front carriage are actuated is determined by the adjustment of the stops 183 by the set screw 184 and the stop 185 by the set screw 186.

The slidable yoke 187 has a finely adjusted screw 188 adjusted by the knurled member 189.

The position of the stops on their slide rod 190 determines the points at which the inward movement of the tool is arrested and the outward movement of the tool causes the carriage to start to the right hand back to its initial position. Stops, such as 183 and 185 engage the plungers 191 which are yieldingly held in position by the springs 192. These plungers in turn actuate the push rod 193 having a head 194 to move the switch blade from one contact to the other. A typical switch of this character is shown in Figure 31. The same type of switch is used throughout the machine. It is this type of switch that is used at 248, 257, 266, 300, etc. As the mechanism for actuating these switches is the same on the front and rear carriages and as the mechanism for adjusting the stops and the stops themselves are of the same construction, I have used similar numerals for similar parts on the front and rear carriages.

Turning to the rear carriage 14 shown in some detail in Figure 21 and Figure 19, the feed rod 16 carries the beveled pinion 195 which operates the beveled pinion 196 on the jack shaft 197. This shaft in turn carries the gear 196a that operates the intermediate gear 198a on the jack shaft 198b. This pinion 198a in turn meshes with the pinion 198c on the screw 198 that operates in the nut 198e carried by the rear tool slide 199 that in turn carries a tool.

Electrical control

The electrical control of this invention in automatic machine tools is arranged as follows:

200 designates the positive side of a 110-volt direct current line and 201 indicates the negative side. 202 designates a starter switch panel having a switch 203 for starting, which, when closed, engages the terminals 204, 205 and 206 connected to the switches 207, 208 and 209 respectively. Switch 209 controls the front carriage. A switch 207 controls the rear carriage and switch 208 controls the main drive spindle. On this switch panel 202 is a switch 210 adapted to engage the terminals 211 and 212 in order to reverse the rear carriage. The terminal 211 is connected by a wire 213 to terminal 214 which is also engaged by the switch 203.

Switch 215 on the panel 202 is used for reversing the front carriage. It engages terminals 216 and 217.

Switch 218 is a stop switch engaging terminals 219 and 220. Terminal 220 is connected to terminals 216, 211 and 214 through the wire 213.

When it is desired to start the front carriage, the rear carriage and the main drive spindle at the same time, the switches 207, 208 and 209 are closed. At this time, the limit switch 221 is inoperative. It is adapted to engage the stop 221a. If it is desired to start the rear carriage after the front carriage is started, it is done by opening switch 207 and, when switch 221 is closed, the rear carriage will start.

For setting up purposes, either carriage or spindle may be stopped by controlling the switch 207, 208 and 209.

If it is desired to reverse either carriage any time during the cycle of operations, this may be done by operating the reversing switches 210 or 215 by closing them.

By pushing the stop button 218, the machine can be stopped at any position during the cycle through lines 200, terminals 219 and 220 and line 222 thereby breaking the circuit on either of the relays 239, 249, 258 or 267.

Front carriage

To operate the front carriage, close switch 203, positive current is supplied from line 200 to lines 219, 218, 220, 222, post 223, switch blade 224, post 225, line 226, post 227, switch blade 228, post 229, line 230, post 231, blade 232, post 233, line 234, post 235, switch blade 236, line 237 to the switch 209. This results in moving switch blade 236 to terminal 238 to energize the relay 239. This energizes the transverse feed-in magnet 240 through the lines 241 and 242 across which lines is connected the condenser 243. This connects lines 244, 245, 246, 247 and 201 in the negative side of the circuit.

The result is that the transverse tool slide feeds inwardly and will continue to feed in until it strikes the longitudinal feed forward switch 248. This results in energizing the coil of the relay 249 at the same time that relay 239 is opened. The relay 249 is closed through the lines 250, switch 248, line 251. Switch blade 232 leaves post 233 and goes to post 252. This energizes the lines 253 and 254 which in turn energize the longitudinal feed forward magnet 255 and condenser 256.

It also serves to keep in circuit the lines 244, 245, 246, 247 and 201. This causes the tool to move longitudinally along the bed toward the head stock until it strikes transverse out switch 257. This energizes the relay 258 moving the switch blade 228 to the post 259 by reason of the energizing of the line 260 and 261 through the switch 257. This results in energizing the lines 262 and 263 which include the magnet 264 and condenser 265. The lines 246, 247, and 201 are still in circuit. Coincidental with this operation 249 is deenergized and switch 232 is moved back to engagement with terminal 233.

This causes the tool to move outwardly until it strikes longitudinal rapid traverse reverse switch 266.

This results in energizing the relay 267 as the switch arm 224 is moved over to the terminal 268 which energizes magnet 278, control 279, line 280—247. Lines 269, switch 266 and line 270 are then inserted. The relay brings into circuit the wire 271. It also brings into circuit the line 272, switch 273, line 274 back to the terminal 268. Wire 270 is connected across from the switch 266 to the line 273.

This causes the tool to move longitudinally until the switch 273 is engaged which also opens the switch 275 in lines 276 and 277. Line 277 is connected to the switch 209. This results in deenergizing the relay 267 resulting in the opening of the switch 224 bringing the system to rest.

If it is necessary to reverse the front carriage before completing its cycle of movement, this can be done by pushing the reverse starter button 215. The carriage will return to starting position through the operation of the relays 258 and 267 and magnets 264 and 278.

This causes the carriage to strike the stop switch 273.

The magnet 278 with its condenser 279 is connected to the wire 247 on one side and 280 on the other.

Rear carriage

Assuming that the starter button or switch 203 has been depressed and the switch closed, current will flow through the lines; the rear carriage system operates as follows:

Upon closing the starter switch 203, current flows on the positive side through line 200, post 219, switch 218 through posts 220 and 211 and thence through switch 203 to post 204, switch 207, through line 281, line 282, switch 221, line 283 to terminal 284. This brings into circuit line 285, post 286, switch plate 287, terminal 288.

Turning to the other portion of the line at post 284, it will be noted that switch blade 289, line 290 and line 291 are in circuit.

This results in energizing the relay coil 292 which moves the switch blade 287 to the terminal post 293. 292 is the relay for the transverse feed-in magnet 294 which is supplied by the lines 295 and 296. The condenser for this magnet is designated 297. Line 295 is connected by the line 298, line 299 to the line 201 on the negative side of the circuit.

The result of this operation is the feed-in movement of the tool until the tool slide engages the transverse out switch 300. This results in deenergizing the relay 292 opening the switch 287 and energizing the relay 301. The switch 289 is closed by moving over to the terminal 302.

Thus, the circuit comprising wire 291, switch 300, wire 303, stop switch 304, wire 305, terminal 302, switch blade 289, wire 290 and 291 are brought in circuit. The energization of the relay 301 results in bringing into circuit through the wires 306 and 307 the transverse traverse out magnet 308 which has associated therewith the condenser 309. The result of this outward movement is that, upon the tool slide opening the stop switch 304, the relay 301 is deenergized and the system is brought to a stop so far as the rear carriage is concerned.

Main drive clutch

On the positive side of the circuit starting with the wire 200, connections will be made as indicated to the switch 208 which in turn is connected to the line 310, line 311, relay 312. On the negative side through the wire 201, line 313 is energized which results in switch blade 314 being moved to terminal 315 so that the spindle drive magnet 316 with its condenser 317 is placed in circuit through the wires 318 and 319. This causes the main driving spindle to start.

When it is desired to stop the driving operation, it is necessary to open both the switches 304, 273 and 275 which results in so deenergizing the lines associated therewith as to deenergize the relay 312 opening the drive spindle circuit.

This results in energizing the brake magnet 320 through the lines 321 and 322 to bring the work promptly to rest. 323 is the condenser associated with the brake spindle magnet 320. If it is necessary to reverse the rear carriage before completing its cycle, you can push the reverse button on the starter. The carriage will then return to starting position through the relay 301 and its associated mechanism, which movement will continue until the carriage strikes the stop switch mechanism 304.

Oiling system

In order to make the tool completely automatic, I have provided an automatic oiling system that is self-contained within the carriages and travels with the carriages and is actuated in proportion to the actuation of the carriages and the tool slides so that the amount of lubricant delivered will be in proportion to the amount of work performed.

Turning to Figures 17 and 18 on the front carriage, I provide on the feed rod shaft 11 a cam 324 which actuates a bell crank 325, the free end of which at 326 is mounted within a slot 327 in a pump piston 328. This piston is guided in the brackets 329 against the resistance of the spring 330. The bracket also carries the cylinder 331 to which is connected a delivery pipe 332. The base 333 and the casing 334 act as an oil reservoir or sump for the lubricant. The lubricant drains back into this sump and reservoir after having been delivered to the surfaces to be lubricated and the gears to be lubricated. The delivery pipe 332 passes to a distribution manifold 335. This manifold delivers oil through the pipe 336 to an oil distribution pan 337. From this pan oil is delivered by the pipe 338 to the lead screw and its nut 167. The pipe 339 lubricates the engaging surface between the lower faces of the carriage and the tool bed as at 340. The pipe 341 oils the cross feed nut. The pipe 342 oils the left hand slide. The pipe 343 oils the rear cross feed screw bearing. The pipe 344 lubricates the carriage slide. The pipe 345 lubricates the right hand slide. The pipe 346 lubricates the cross feed bushing.

Turning to the rear carriage, the jack shaft 197 has a cam 347 which is similar to the cam 324 and actuates a similar pump which I have designated by the same numerals. This pump supplies lubricant through the supply pipe 348, to the distribution manifold 349. The pipe 350 supplies oil to the oil pan 351 in which there are formed passages so that the gears 198a and 198b may be lubricated and which in turn delivers oil to the pipes 352 and 353.

The pipe 353 lubricates the shafts 198 and 353a. The pipe 352 lubricates bearings 197a for the shaft 197. The pipe 354 lubricates the cross feed nut cross feed shaft screw, while the cross feed slide is lubricated through the pipes 355.

Rear carriage stop adjustment

If it is desired to limit the lateral position of the rear carriage, I provide a stop 356 mounted on a screw 357 in a collar 358. This screw can be adjusted in position by the collar 359 having a head 360. This collar is mounted upon the bed through the bracket 361.

Mechanical clutch on main drive

If desired, a mechanical clutch 362 actuated through the links 363, yoke 364 and shaft 365 can be provided in place of the magnetic clutch. Such alternative view is shown in Figure 6.

Head stock gearing lubrication

Figure 4:
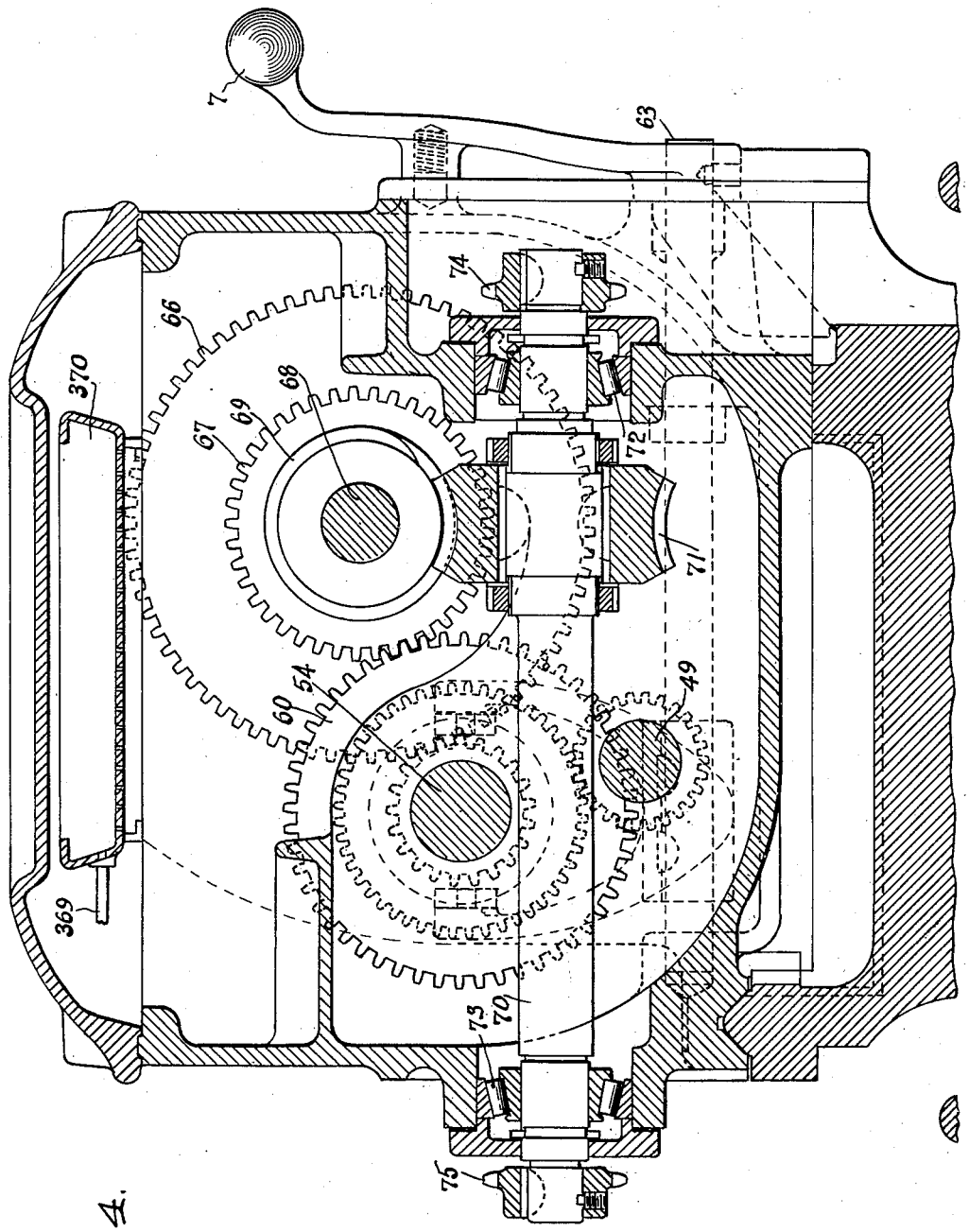
Figure 4 is a section on the line 4—4 of Figure 2 showing in section the head stock gear box.
Figure 5:
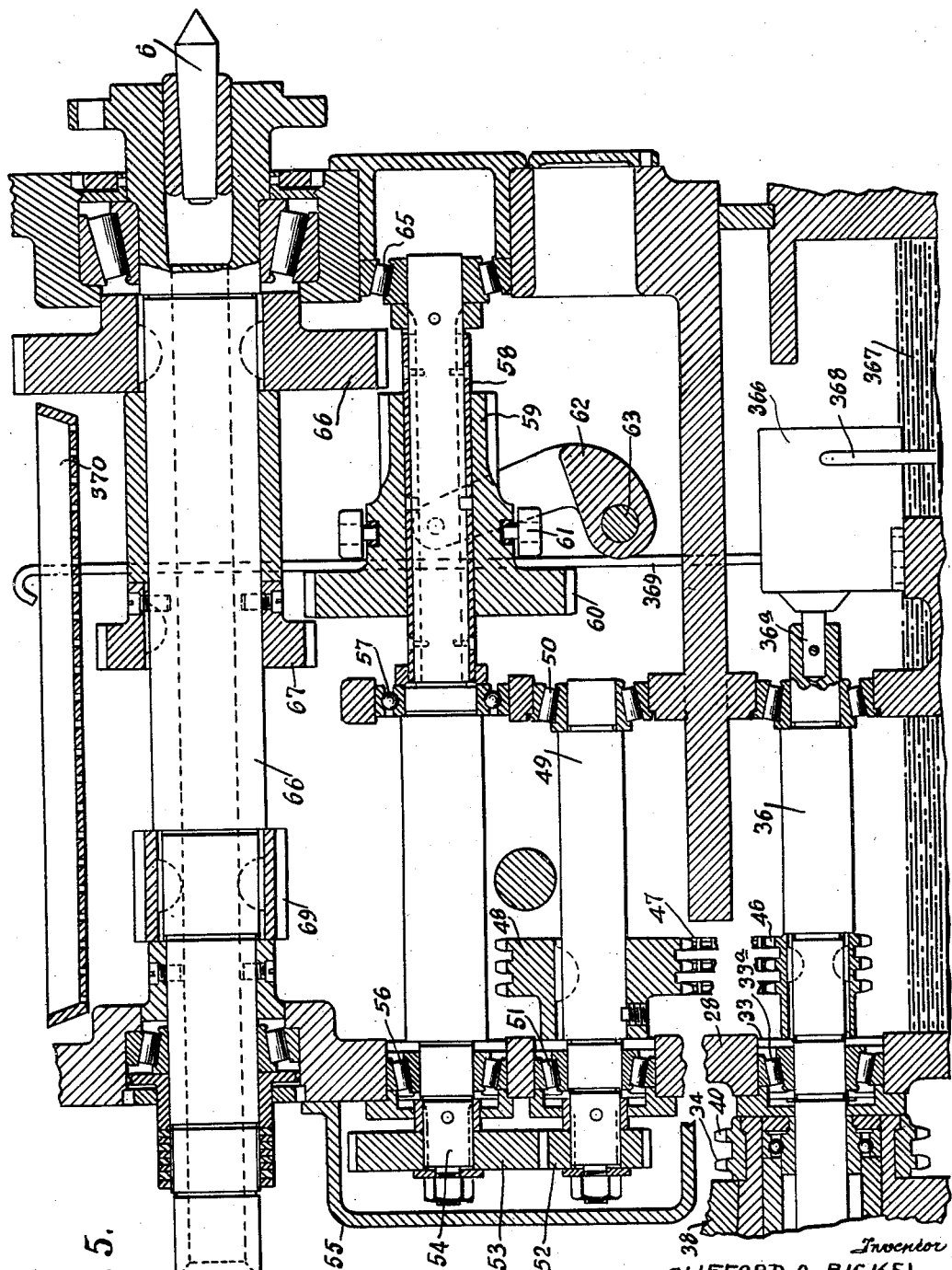
Figure 5 is a vertical section through the head stock gearing with the several shafts and gears laid out in order to show their arrangement.

Referring to Figures 4 and 5, I provide a pump 366. This pump is connected to the pulley shaft 36 by the coupling 36a. It delivers oil from the sump 367 through the intake pipe 368 through the pump to the outlet pipe 369 whence it is delivered into the pan 370 from which it drips over the gears, sprockets and chains as well as the bearings and lubricates the entire interior mechanism of the head stock.

Tail stock

The detail construction of the tail stock 12 is shown in Figures 7, 8 and 9. This tailstock 12 possesses the novel feature of having its spindle 13 either locked in position or moved forward relative to the remainder of the tailstock by manipulation of a single handle 12a.

The spindle 13 is mounted within the rack sleeve 13a and is adjusted by the spur gear 13b. 12a indicates the clamping handle while the stock itself is adjusted on the tool bed by the clamping plates 12c, bolts 12d and nuts 12e. The handle 12a is provided with a yoke 400 having a cam portion 401 which is mounted on the pin 402 passing through the gear shaft 403. The cam portion 401 engages a washer 404 which in turn engages the locking plunger 405. The latter is reciprocable in a cylindrical bore 406 (Figure 7) and its motion is resisted by the spiral compression spring 407 mounted within the internal bore 408. The locking plunger 406 is provided with a curved portion 409 which engages the outside surface of the rack holder 13a.

The gear shaft 403 in adjustably held in position by the lock nuts 411. The spur gear 13b is keyed to the gear shaft 403.

When the handle 12a is in the horizontal position shown in Figures 7 and 8, its cam portion 401 exerts no pressure upon the locking plunger 406. The rack sleeve 13a may then be moved in or out through the rotation of the spur 13b by swinging the handle 12a horizontally. When the rack sleeve has reached a desired position, the handle 12a is raised, whereupon the cam portion 401 forces the locking plunger 406 downward against the rack sleeve 13a, locking the latter in position.

Front lead screw brake

As will be seen in Figures 13 and 14, the lead screw 10 is provided on its right hand end with an adjustable nut 10a which adjusts the tension on a spring 10b that in turn presses a brake shoe 10c upon the tool bed at 10d. Such a brake prevents spinning of the feed screw. A similar brake is provided for the feed rod 11.

Rear feed rod box and brake

Referring to Figures 27 and 28 it will be noted a similar construction is provided for the rear feed rod by way of a brake to prevent its overrun and spinning.

It will be noted from the foregoing construction and arrangement that I have provided a single driving motor, thus reducing the complication of multiple motor controls, switches and allied electrical mechanism as well as the expense both of the motors and of multiple controls thereof It will also be observed that this sequence of operations is provided:

(a) That, upon the closing of the starter button 203, the feed slide moves inwardly and is controlled by its magnet 240, then the longitudinal feed to the left of the carriage is effected by the slide operating the switch 248.

(b) When the carriage gets to its extreme left hand position where it is desirable to stop it and withdraw the tool, the feed slide is moved outwardly by the carriage operating switch 257 which is engaged and operated by the carriage moving against it in its left hand movement.

(c) The feed out movement of the tool is very fast and, upon its accomplishment, the tool with its slide operates the switch 266 which moves the carriage towards the right hand to its initial position.

(d) Upon the accomplishment of this full right hand movement, the carriage strikes the stop switch 273 and is brought to rest.

All of this movement is performed including the rotation of the work in synchronism from a common motor. Lubrication is also automatically performed.

All that is necessary after setting up the machine is to operate the starter button and the machine tool automatically performs the rest of the operations.

The rear carriage with its tool likewise will operate automatically, the tool being fed into the work and then being removed from the work at a predetermined interval depending upon the depth of cut desired.

The operation of the front tool slide and carriage is diagrammatically illustrated together with the stops, switches and magnets in Figure 29. The arrows indicate the direction of movement of the parts when actuated. For instance, the starter 203 when pressed will cause the tool slide to move inwardly to the work while the carriage is still at rest. This continues until the left feed forward switch 248 is engaged by the tool slide stop which then causes the carriage to move to the left until it engages the switch 257 which causes the tool slide to feed out. This continues until the stop on the tool slide engages the switch 266 which causes the carriage to move again to the right, which it continues to do until it engages the stop. I have illustrated in Figure 29 diagrammatically the several magnets associated with these movements. For instance, magnet 240 controls the inward movement of the tool. Magnet 255 controls the left hand longitudinal movement. Magnet 264 controls the outward movement of the tool and magnet 278 the right hand movement of the carriage back to its initial position.

In Figure 30 the diagrammatic layout of the rear carriage is indicated. By pressing the starter button 221, the tool and its slide moves inwardly until its stop reaches the switch 300 whereupon it is withdrawn until its stop engages the stationary stop switch 304 and brings it to rest. These two movements are controlled by the respective magnets 294 which control the feeding in movement and 308 which controls the feeding out movement.

The spindle drive magnet 316 controls the driving of the spindle and the bringing of the spindle to rest is controlled by the magnet 320.

It will be understood that I desire to comprehend within my invention such modifications as may be necessary to adapt it to varying conditions and uses.

Having thus fully described my invention, what I claim as new and desire to secure by Letters Patent, is:

1. In a machine tool having a bed, a carriage, a tool slide, means for supporting a work piece, an actuating motor, means for driving said work piece from the motor, means for operating the carriage and the tool slide from the motor, a system of magnets in circuit with said motor, a system of switches in circuit therewith whereby upon closing the circuit the work will be rotated, the tool slide will move the tool into the work, the tool will be moved along the work, then out of the work and thereafter the carriage will be returned to its initial position opening the entire circuit and stopping all the parts.

2. In a machine tool having a bed, a carriage, a tool slide, means for supporting a work piece, an actuating motor, means for driving said work piece from the motor, means for operating the carriage and the tool slide from the motor, a system of magnets in circuit with said motor, a system of switches in circuit therewith whereby upon closing the circuit the work will be rotated, the tool slide will move the tool into the work, the tool will be moved along the work, then out of the work and thereafter the carriage will be returned to its initial position opening the entire circuit and stopping all the parts, and means for magnetically braking the movement of the driving means for the work upon the opening of the remainder of the circuit to prevent spinning of the work.

3. In a machine tool having a bed, a carriage, a tool slide, means for supporting a work piece, an actuating motor, means for driving said work piece from the motor, means for operating the carriage and the tool slide from the motor, a system of magnets in circuit with said motor, a system of switches in circuit therewith whereby upon closing the circuit the work will be rotated, the tool slide will move the tool into the work, the tool will be moved along the work, then out of the work and thereafter the carriage will be returned to its initial position opening the entire circuit and stopping all the parts, a second carriage, a tool slide adapted to move to the work with its tool and thereafter move the tool from the work, a switch in said circuit for starting the tool towards the work including a magnetic clutch for connecting the tool slide to the motor, and a second switch and magnetic clutch for moving the tool from the work and a switch for rendering the tool slide and its tool inoperative upon the accomplishment of the outward movement.

4. In combination in an automatic machine tool having a base, a driving motor and circuit, a work rotating means, a carriage and tool slide means on the base, a starter switch for the motor, a transverse feed-in magnet clutch for the tool slide means, a longitudinal feed forward switch and magnetic clutch for the carriage, a transverse traverse out switch and magnetic clutch for the tool slide means, a longitudinal reverse transverse magnetic switch and clutch for the carriage, and a stop switch in said circuit.

5. In combination in an automatic machine tool having a base, a driving motor and circuit, rotating means, a carriage and tool slide means on the base, a starter switch for the motor, a transverse feed-in magnet clutch for the tool slide means, a longitudinal feed forward switch and magnetic clutch for the carriage, a transverse traverse out switch and magnetic clutch for the tool slide means, a longitudinal reverse transverse magnetic switch and clutch for the carriage, a stop switch in the circuit, and a magnetic clutch for the work driving means.

6. In combination in an automatic machine tool having a base, a driving motor and circuit, rotating means, a carriage and tool slide means on the base, a starter switch for the motor, a transverse feed-in magnet clutch for the tool slide means, a longitudinal feed forward switch and magnetic clutch for the carriage, a transverse traverse out switch and magnetic clutch for the tool slide means, a longitudinal reverse transverse magnetic switch and clutch for the carriage, a stop switch in the circuit, a magnetic clutch for the work driving means, and a magnetic brake for the work driving means.

7. In combination in an automatic machine tool having a base, a driving motor and circuit, rotating means, a carriage and tool slide means on the base, a starter switch for the motor, a transverse feed-in magnet clutch for the tool slide means, a longitudinal feed forward switch and magnetic clutch for the carriage, a transverse traverse out switch and magnetic clutch for the tool slide means, a longitudinal reverse transverse magnetic switch and clutch for the carriage, a stop switch in the circuit, a magnetic clutch for the work driving means, a magnetic brake for the work driving means, a rear carriage having a tool slide, a starter switch and magnetic clutch for feeding said tool and tool slide inwardly, a magnet clutch and transverse reverse switch for feeding the tool and its slide outwardly, and a rear carriage stop switch.

8. In an automatic machine tool having a bed, a driving motor, a carriage, a tool slide, means of longitudinally moving the carriage by the motor from a lead screw, means of transversely moving the tool slide by a feed rod driven by the motor, means to support and rotate the work driven by the motor, the combination of an electric circuit including a starter switch, a transverse feed-in magnet clutch connecting the motor to feed with the tool slide in, a longitudinal feed forward switch and magnet clutch for moving the carriage to the left hand, a transverse switch and clutch for moving the tool out, a longitudinal switch and magnet clutch for feeding the carriage back to its right hand position, a magnet clutch for connecting the motor to the work driving means when the starter switch is closed, and a common stop switch for rendering the motor inoperative upon the return of the carriage to its initial right hand position.

9. In an automatic machine tool having a bed, a driving motor, a carriage, a tool slide, means of longitudinally moving the carriage by the motor from a lead screw, means of transversely moving the tool slide by a feed rod driven by the motor, means to support and rotate the work driven by the motor, the combination of an electric circuit including a starter switch, a transverse feed-in magnet clutch connecting the motor to feed with the tool slide in, a longitudinal feed forward switch and magnet clutch for moving the carriage to the left hand, a transverse switch and clutch for moving the tool out, a longitudinal switch and magnet clutch for feeding the carriage back to its right hand position, a magnet clutch for connecting the motor to the work driving means when the starter switch is closed, a common stop switch for rendering the motor inoperative upon the return of the carriage to its initial right hand position, and a rear carriage mounted on the tool bed having a tool slide, a magnet clutch and switch for feeding the tool slide inwardly connected in said circuit, a magnet clutch and switch for feeding the tool and its slide outwardly connected to said circuit and a rear carriage stop switch engaged by the tool slide when it is moved outwardly to render the rear carriage portion of the circuit and mechanism inoperative.

10. In a system of control for automatic lathes, a driving motor, a carriage moved by the motor, a work rotating means, a magnet clutch connecting the work rotating means to the carriage, and means controlled by the movement of the carriage on the lathe for controlling said magnet clutch.

11. In a system of control for automatic lathes, a common driving motor, a work rotating means, a magnet clutch connecting the motor thereto, means controlled by the movement of the carriage on the lathe for controlling said magnet clutch, a lead screw and a feed rod driven by said motor through said magnet clutch, gearing associated with said rod and screw so driven, magnet clutches for alternately controlling the actuation of the screw rod and switches associated therewith controlling said magnets whereby the movement in of the tool by the feed rod will result in moving the carriage longitudinally by the screw and longitudinally moving the carriage will result in moving the tool outwardly by the rod.

12. In a system of automatic control for a lathe, a power circuit, a driving motor therein, a spindle driving circuit, a front longitudinal drive carriage circuit, a front tool slide circuit and a rear tool slide circuit, a system of switches and magnet clutches in said circuit for connecting the carriage and tool slides to effect predetermined movements thereof.

13. In a system of automatic control for a lathe, a power circuit, a driving motor therein, a spindle driving circuit, a front longitudinal drive carriage circuit, a front tool slide circuit and a rear tool slide circuit, a system of switches and magnet clutches in said circuit for connecting the carriage and tool slides to effect predetermined movements thereof, and reversing switches mounted in said circuits of the tool slides and carriages for reversing the movement thereof.

14. In a system of automatic control for a lathe, a power circuit, a driving motor therein, a spindle driving circuit, a front longitudinal drive carriage circuit, a front tool slide circuit and a rear tool slide circuit, a system of switches and magnet clutches in said circuit for connecting the carriage and tool slides to effect predetermined movements thereof, and reversing switches mounted in said circuits of the tool slides and carriages for reversing the movement thereof, and a stop switch associated with at least one of said switches for rendering all circuits inoperative.

15. In a system of automatic control for a lathe, a power circuit, a driving motor therein, a spindle driving circuit, a front longitudinal drive carriage circuit, a front tool slide circuit and a rear tool slide circuit, a system of switches and magnet clutches in said circuit for connecting the carriage and tool slides to effect predetermined movements thereof, and reversing switches mounted in said circuits of the tool slides and carriages for reversing the movement thereof, a stop switch associated with at least one of said switches for rendering all circuits inoperative, and independent controlling switches in each of said circuits for independently controlling the operation thereof of the other circuit.

16. In a machine tool, a system of actuating the work piece and the cutting tool comprising a bed, a motor, a main drive magnetic clutch, a head stock, a head stock gearing driven therethrough, a front gear box, gearing controlling a front carriage lead screw and feed rod, a feed rod, a lead screw, a carriage operated by the screw, a tool slide operated by the rod, magnetic clutches arranged in pairs associated with said rod and screw in the gear box adapted to reverse the direction of movement of the rod and screw, and switches associated with said carriage and tool slide for alternately actuating said clutches for determining the direction of movement of the tool slide and carriage.

17. In a system of automatic control for a lathe, a driving motor, a system of driving gears, a feed rod connected thereto, a lead screw connected thereto, a carriage moved longitudinally by the screw, a tool slide thereon moving transversely, magnetic clutches arranged in pairs adapted to alternately connect said rod and screw so as to drive them in opposite directions from the common driving motor without reversing the direction of the motor.

18. In a system of automatic control for a lathe, a driving motor, a system of driving gears, a feed rod connected thereto, a lead screw connected thereto, a carriage moved longitudinally by the screw, a tool slide thereon moving transversely, magnetic clutches arranged in pairs adapted to alternately connect said rod and screw so as to drive them in opposite directions from the common driving motor without reversing the direction of the motor, a switch on the tool slide actuated at its innermost position for connecting the screw to the motor and disconnecting the motor from the feed rod.

19. In a system of automatic control for a lathe, a driving motor, a system of driving gears, a feed rod connected thereto, a lead screw connected thereto, a carriage moved longitudinally by the screw, a tool slide thereon moving transversely, magnetic clutches arranged in pairs adapted to alternately connect said rod and screw so as to drive them in opposite directions from the common driving motor without reversing the direction of the motor, a switch on the tool slide actuated at its innermost position for connecting the screw to the motor and disconnecting the motor from the feed rod, a switch actuated by the carriage for disconnecting the screw from the motor and connecting the feed rod in reverse to move the tool slide out.

20. In a system of automatic control for a lathe, a driving motor, a system of driving gears, a feed rod connected thereto, a lead screw connected thereto, a carriage moved longitudinally by the screw, a tool slide thereon moving transversely, magnetic clutches arranged in pairs adapted to alternately connect said rod and screw so as to drive them in opposite directions from the common driving motor without reversing the direction of the motor, a switch on the tool slide actuated at its innermost position for connecting the screw to the motor and disconnecting the motor from the feed rod, a switch actuated by the carriage for disconnecting the screw from the motor and connecting the feed rod in reverse to move the tool slide out, a switch actuated by the tool slide for disconnecting the feed rod from the motor and for connecting the screw in reverse to return the carriage to its initial position.

21. In a system of automatic control for a lathe, a driving motor, a system of driving gears, a feed rod connected thereto, a lead screw connected thereto, a carriage moved longitudinally by the screw, a tool slide thereon moving transversely, magnetic clutches arranged in pairs adapted to alternately connect said rod and screw so as to drive them in opposite directions from the common driving motor without reversing the direction of the motor, a switch on the tool slide actuated at its innermost position for connecting the screw to the motor and disconnecting the motor from the feed rod, a switch actuated by the carriage for disconnecting the screw from the motor and connecting the feed rod in reverse to move the tool slide out, a switch actuated by the tool slide for disconnecting the feed rod from the motor and for connecting the screw in reverse to return the carriage to its initial position, and a stop switch actuated by the carriage for rendering the system inoperative.

22. In a system of automatic control for a lathe having a carriage bed, a tool slide on the carriage, and a driving spindle for the work, a common motor, means for driving the spindle from the motor including a magnetic clutch, means driven from said spindle for actuating in opposite directions a lead screw and feed rod comprising magnetic clutches arranged in pairs for alternately actuating said screw and rod.

23. In a system of automatic control for a lathe having a carriage bed, a tool slide on the carriage, and a driving spindle for the work, a common motor, means for driving the spindle from the motor including a magnetic clutch, means driven from said spindle for actuating in opposite directions a lead screw and feed rod comprising magnetic clutches arranged in pairs for alternately actuating said screw and rod, a starter switch for closing the circuit to the motor and the magnet spindle clutch and the feed rod forward magnet clutch, a second switch actuated by the tool slide for rendering the feed rod forward clutch inoperative and the screw forward magnet clutch operative, a third switch for rendering the screw inoperative and the feed rod reverse magnet clutch operative, and a fourth switch for rendering the last mentioned clutch inoperative and the reverse magnet clutch of the screw operative.

24. In a system of automatic control for a lathe having a carriage bed, a tool slide on the carriage, and a driving spindle for the work, a common motor, means for driving the spindle from the motor including a magnetic clutch, means driven from said spindle for actuating in opposite directions a lead screw and feed rod comprising magnetic clutches arranged in pairs for alternately actuating said screw and rod, a starter switch for closing the circuit to the motor and the magnet spindle clutch and the feed rod forward magnet clutch, a second switch actuated by the tool slide for rendering the feed rod forward clutch inoperative and the screw forward magnet clutch operative, a third switch for rendering the screw inoperative and the feed rod reverse magnet clutch operative, and a fourth switch for rendering the last mentioned clutch inoperative and the reverse magnet clutch of the screw operative, and a fifth switch for rendering all of the clutches inoperative and bringing the system to rest.

25. In a lathe, a bed, stocks for supporting and rotating the work, a carriage tool slide, a driving spindle for the work, a motor, a feed rod, a lead screw, a gear box having reverse gearing connected to the feed rod and screw, means of driving the spindles from the motor, and means of driving the lead screw and feed rod gearing from the spindle, a clutch connecting the spindles and motor, magnetic clutches in the gear box for connecting the screw and feed rod to the gearing to drive them in opposite directions.

26. In an automatic lathe, a common driving means, a lead screw, a feed rod, means connecting said feed rod and lead screw to the common driving means, a pair of magnetic clutches associated with said lead screw, a pair of magnetic clutches associated with said feed rod, gearing associated with said clutches, screw and rods whereby upon alternate actuation of said magnetic clutches the lead screw and feed rod will be actuated in opposite directions in proportion to the ratio of the gearing.

27. In an automatic lathe, a common driving means, a lead screw, a feed rod, means connecting said feed rod and lead screw to the common driving means, a pair of magnetic clutches associated with said lead screw, a pair of magnetic clutches associated with said feed rod, gearing associated with said clutches, screw and rods whereby upon alternate actuation of said magnetic clutches the lead screw and feed rod will be actuated in opposite directions in proportion to the ratio of the gearing, and switch means controlling said magnetic clutches associated with the carriage and tool slide whereby the tool slide controls the movement of the carriage and the carriage the movement of the tool slide.

28. In combination in a machine tool of a gear box containing a lead screw jack shaft, a lead screw attached thereto, an intermediate gearing associated with a pair of armatures adapted to alternately drive the lead screw jack shaft, a rapid traverse longitudinal shaft driven by a source of power, a magnet thereon associated with one of said armatures, a longitudinal magnet shaft and a magnet associated with the other of said armatures, a cross feed shaft geared to said longitudinal magnet shaft, a magnet on the cross feed schaft, a rapid traverse tool slide shaft and a magnet thereon, a common gear, armatures between said last mentioned magnets adapted to be alternately operated by said magnets, a feed rod jack shaft and feed rod connected to said gear, and means connecting said rapid traverse tool slide shaft to said source of power whereby the alternate operation of said clutches will operate said feed rod and lead screw in alternate directions from a common source of power without reversing the direction of movement of the source of power.

29. In a machine tool, a lead screw, a feed rod, a common source of power, a system of gearing connecting said feed rod and lead screw to the common source of power, and pairs of magnetic clutches alternately operable for determining the direction of movement of the lead screw and the feed rod.

30. In a machine tool, a lead screw, a feed rod, a common source of power, a system of gearing connecting said feed rod and lead screw to the common source of power, pairs of magnetic clutches alternately operable for determining the direction of movement of the lead screw in the feed rod, and a system of switches controlled by the movement of the lead screw and feed rod.

31. In a machine tool, a lead screw, a feed rod, a common source of power, a system of gearing connecting said feed rod and lead screw to the common source of power, pairs of magnetic clutches alternately operable for determining the direction of movement of the lead screw in the feed rod, and a system of switches controlled by the movement of the lead screw and feed rod so arranged that the movement of the lead screw will operate the switch that controls the movement of the feed rod and the movement of the feed rod will operate the switch controlling the movement of the lead screw.

32. In an electrical system for controlling the operation of an automatic lathe comprising machine tool mechanism having work and tool operating instrumentalities, a main power circuit including a driving motor, a main starting switch, a front carriage circuit comprising a relay, a relay switch, and a magnet for connecting the machine tool mechanism to the source of power.

33. In an electrical system for controlling the operation of an automatic lathe comprising machine tool mechanism having work and tool operating instrumentalities, a main power circuit including a driving motor, a main starting switch, a front carriage circuit comprising a relay, a relay switch, a magnet for connecting the machine tool mechanism to the source of power, and a switch for rendering the relay switch and magnet inoperative and rendering another magnet relay and switch operative for controlling another movement of the mechanism of the machine tool without detaching it from its source of power to the motor.

34. In an electrical system for controlling the operation of an automatic lathe, a main power circuit including a common driving motor for actuating the feed rod, lead screw, carriage, tool slide and work driving spindle, a common starter switch, a relay switch and spindle driving magnet on one circuit, a carriage circuit comprising a transverse feed-in magnet relay and switch, a longitudinal feed forward magnet switch relay and relay switch, a transverse rapid traverse out switch magnet relay and relay switch, and a longitudinal rapid traverse return switch magnet relay and relay switch.

35. In an electrical system for controling the operation of an automatic lathe, a main power circuit including a common driving motor for actuating the feed rod, lead screw, carriage, tool slide and work driving spindle, a common starter switch, a relay switch and spindle driving magnet on one circuit, a carriage circuit comprising a transverse feed-in magnet relay and switch, a longitudinal feed forward magnet switch relay and relay switch, a transverse rapid traverse out switch magnet relay and relay switch, a longitudinal rapid traverse return switch magnet relay and relay switch, and a common stop switch.

36. In an electrical system for controlling the operation of an automatic lathe, a main power circuit including a common driving motor for actuating the feed rod, lead screw, carriage, tool slide and work driving spindle, a common starter switch, a relay switch and spindle driving magnet on one circuit, a carriage circuit comprising a transverse feed-in magnet relay and switch, a longitudinal feed forward magnet switch relay and relay switch, a transverse rapid traverse out switch magnet relay and relay switch, a longitudinal rapid traverse return switch magnet relay and relay switch, a common stop switch, a third circuit for the rear carriage and tool slide comprising a rear carriage starter switch and relay switch and a transverse feed-in magnet, a transverse rapid traverse out switch magnet relay and relay switch, and a stop switch connected with the first mentioned stop switch.

37. In an electrical system for controlling the operation of an automatic lathe, a main power circuit including a common driving motor for actuating the feed rod, lead screw, carriage, tool slide and work driving spindle, a common starter switch, a relay switch and spindle driving magnet on one circuit, a carriage circuit comprising a transverse feed-in magnet relay and switch, a longitudinal feed forward magnet switch relay and relay switch, a transverse rapid traverse out switch magnet relay and relay switch, a longitudinal rapid traverse return switch magnet relay and relay switch, a common stop switch, a third circuit for the rear carriage and tool slide comprising a rear carriage starter switch and relay switch and a transverse feed-in magnet, a transverse rapid traverse out switch magnet relay and relay switch, a stop switch connected with the first mentioned stop switch, and a spindle brake magnet associated with the spindle driving magnet, its relay and relay switch.

38. In an electrical system for controlling the operation of an automatic lathe, a main power circuit including a common driving motor for actuating the feed rod, lead screw, carriage, tool slide and work driving spindle, a common starter switch, a relay switch and spindle driving magnet on one circuit, a carriage circuit comprising a transverse feed-in magnet relay and switch, a longitudinal feed forward magnet switch relay and relay switch, a transverse rapid traverse out switch magnet relay and relay switch, a longitudinal rapid traverse return switch magnet relay and relay switch, a common stop switch, a third circuit for the rear carriage and tool slide comprising a rear carriage starter switch and relay switch and a transverse feed-in magnet, a transverse rapid traverse out switch magnet relay and relay switch, a stop switch connected with the first mentioned stop switch, a spindle brake magnet associated with the spindle driving magnet, its relay and relay switch, and independent switches for controlling the spindle driving magnet circuit, the front carriage magnet circuit and the rear carriage magnet circuit.

39. In an electrical system for controlling the operation of an automatic lathe, a main power circuit including a common driving motor for actuating the feed rod, lead screw, carriage, tool slide and work driving spindle, a common starter switch, a relay switch and spindle driving magnet on one circuit, a carriage circuit comprising a transverse feed-in magnet relay and switch, a longitudinal feed forward magnet switch relay and relay switch, a transverse rapid traverse out switch magnet relay and relay switch, a longitudinal rapid traverse return switch magnet relay and relay switch, a common stop switch, a third circuit for the rear carriage and tool slide comprising a rear carriage starter switch and relay switch and a transverse feed-in magnet, a transverse rapid traverse out switch magnet relay and relay switch, a stop switch connected with the first mentioned stop switch, a spindle brake magnet associated with the spindle driving magnet, its relay and relay switch, and independent switches for controlling the spindle driving magnet circuit, the front carriage magnet circuit and the rear carriage magnet circuit, and independent stop switches for independently rendering inoperative said circuits.

40. In an automatic lathe, the combination of a bed, tool support and work actuating spindles, a front carriage and tool slide, a front lead screw, a front feed rod, a front gear box, a rear carriage and tool slide, a rear feed rod, a rear gear box, a common source of power for driving the gear in said gear boxes and said spindles, a common magnet, clutches for controlling the application of the source of power, magnet clutches in said gear boxes adapted to drive said rods and screw in opposite directions, and a system of switches associated with said front carriage and said front and rear tool slides adapted to operate said clutches for controlling the movements of the screw, the rods, the carriage and the tool slides as well as the movement of the spindles.

41. In an automatic lathe, a base, a motor in said base, a main clutch and driven shaft mounted over said motor on top of said base, a front gear box on one side thereof, a rear gear box on the other side thereof, and means of driving gearing in said box from said driven shaft, a front driving spindle box mounted over said clutch and driven from the driven shaft connected thereto whereby said motor, front and rear gear box and spindle box mechanism are distributed about a common driving shaft center.

42. In a machine tool, a gear box having a casing, a removable face for said casing, and means carried by said face, supporting shafts, gearings, on the shafts, and reversing magnets for operatively connecting certain of said shafts, whereby upon removing the face said gearings, shafts and magnets may be removed as a unit from the casing.

43. In a machine tool, a source of power, a lead screw, a feed rod, a system of gearing between the screw and rod and said source of power, magnetic clutches associated in pairs with the gearing and arranged to connect the rod and screw to the source of power for driving in the same or in opposite directions, and means operated by the rod and by the screw to cut the clutches in and out.

44. In a machine tool, a source of power, a lead screw, a feed rod, a system of gearing between the screw and rod and said source of power, electric means associated in pairs with the gearing and arranged to connect the rod and screw to the source of power for driving in the same or in opposite directions, and means operated by the rod and by the screw to cut in and out the electric means.

CLIFFORD A. BICKEL.